US008477888B2

(12) United States Patent
Lu et al.

(10) Patent No.: US 8,477,888 B2
(45) Date of Patent: Jul. 2, 2013

(54) PHASE-NOISE RESILIENT GENERATION OF A CHANNEL QUALITY INDICATOR

(75) Inventors: Feng Lu, Sunnyvale, CA (US); Prashant Udupa Sripathi, San Jose, CA (US); Liang Zhao, Campbell, CA (US); Parvathanathan Subrahmanya, Sunnyvale, CA (US); Subramanya P. Rao, Santa Clara, CA (US)

(73) Assignee: QUALCOMM Incorporated, San Diego, CA (US)

( * ) Notice: Subject to any disclaimer, the term of this patent is extended or adjusted under 35 U.S.C. 154(b) by 991 days.

(21) Appl. No.: 12/145,322

(22) Filed: Jun. 24, 2008

(65) Prior Publication Data

US 2009/0316842 A1 Dec. 24, 2009

(51) Int. Cl.
*H03D 1/04* (2006.01)

(52) U.S. Cl.
USPC ............................... 375/346; 375/316

(58) Field of Classification Search
USPC .................................. 375/246, 346
See application file for complete search history.

(56) References Cited

U.S. PATENT DOCUMENTS

| | | | | |
|---|---|---|---|---|
| 4,308,618 A | * | 12/1981 | Levy et al. ..................... | 375/235 |
| 5,539,772 A | * | 7/1996 | Fasulo et al. .................. | 375/224 |
| 5,566,214 A | * | 10/1996 | Kroeger et al. ............... | 375/355 |
| 5,663,992 A | * | 9/1997 | Farmer .......................... | 375/376 |
| 5,937,004 A | * | 8/1999 | Fasulo et al. .................. | 375/224 |
| 5,987,084 A | * | 11/1999 | Farmer .......................... | 375/371 |
| 5,995,567 A | * | 11/1999 | Cioffi et al. ................... | 375/346 |
| 6,061,393 A | * | 5/2000 | Tsui et al. ..................... | 375/224 |
| 6,831,955 B1 | * | 12/2004 | Takahashi ..................... | 375/298 |
| 7,336,701 B2 | * | 2/2008 | Kearney et al. ............... | 375/224 |
| 2002/0064233 A1 | * | 5/2002 | Terreault et al. .............. | 375/261 |
| 2003/0003939 A1 | * | 1/2003 | Banerjee ....................... | 455/522 |
| 2008/0026763 A1 | * | 1/2008 | van Rensburg et al. ...... | 455/446 |
| 2008/0032730 A1 | * | 2/2008 | Landau et al. ................ | 455/522 |
| 2008/0032743 A1 | | 2/2008 | Lee | |

FOREIGN PATENT DOCUMENTS

| | | |
|---|---|---|
| CN | 1625067 A | 6/2005 |
| CN | 101090574 A | 12/2007 |
| CN | 101154960 A | 4/2008 |
| EP | 1865617 | 12/2007 |

(Continued)

OTHER PUBLICATIONS

"International Search Report and Written Opinion—PCT/US2009/048263, International Search Authority—European Patent Office—Mar. 25, 2010.".

(Continued)

*Primary Examiner* — Sam K Ahn
*Assistant Examiner* — Santiago Garcia
(74) *Attorney, Agent, or Firm* — Kevin Cheatham

(57) ABSTRACT

System(s) and method(s) are provided for generating phase-noise resilient channel quality indicator(s). A pilot signal utilized to determine a channel quality indicator is rotated to be aligned to a phase reference signal. Separate noise evaluations in quadrature and in-phase directions are utilized, at least in part, to generate a net noise estimate that is phase-noise compensated or resilient. For example, various combination schemes of quadrature and in-phase noise evaluations can be exploited to generate a net noise estimate, the schemes include weighted average of in-phase and quadrature noise estimates and running averages thereof. Simulation of net noise estimates as a function of geometry conditions reveal that the combination schemes provide substantive mitigation of phase-noise, thus making CQI generation phase-noise resilient.

31 Claims, 15 Drawing Sheets

FOREIGN PATENT DOCUMENTS

| | | |
|---|---|---|
| EP | 1885073 | 2/2008 |
| JP | 2008503125 A | 1/2008 |
| JP | 2008514124 | 5/2008 |
| WO | WO 2005125076 | 12/2005 |
| WO | 2006034020 | 3/2006 |

OTHER PUBLICATIONS

Demir et al., "Phase noise in oscillators: a unifying theory and numerical methods for characterization," IEEE trans. Circuits and Systems-I, vol. 47, No. 5, May 2000.

Hajimiri et al. "A general theory of phase noise in electrical oscillators," IEEE J. Solid-State Circuits, vol. 33, pp. 179-194, Feb. 1998.

Leeson, "A simple model of feedback oscillator noise spectrum," Proc. IEEE, vol. 54, No. 2, pp. 329, Feb. 1966.

Mehrotra, "Noise analysis of phase-locked loops," IEEE trans. Circuits and Systems-I, vol. 49, No. 9, Sep. 2002.

Piazzo et al. "Analysis of phase noise effects in OFDM modems," IEEE trans. Comm., vol. 50, No. 10, Oct. 2002.

Taiwan Search Report—TW098121229—TIPO—Jan. 9, 2013.

\* cited by examiner

PHASE-NOISE RESILIENT GENERATION OF A CHANNEL QUALITY INDICATOR

BACKGROUND

1. Field

The subject specification relates generally to wireless communication and, more particularly, to algorithms for mitigation of phase-noise distortion(s) on channel quality indicator reports.

2. Background

Wireless communication systems have become a nearly ubiquitous means for communication of both voice and data, e.g., video and audio streams, file transfers, web-browsing, and so on. Emergence of new markets for wireless communication, increased complexity of subscriber needs, and competition among network operators have driven substantial development of wireless technologies at the user equipment and network level. Such development has synergistically benefited from a steady development of computing capabilities, or processing power, and miniaturization of computing units.

Wireless communication systems can utilize various approaches to effect transmission of information, both control signaling, which provides management of communication resources and monitors conditions of wireless links, and traffic (e.g., voice and data). Such approaches include code division multiplexing (CDM), frequency division multiplexing (FDM), and time division multiplexing (TDM), and their respective multiple access implementation: code division multiple access (CDMA), frequency division multiple access (FDMA), and time division multiple access (TDMA). In systems with multiple antenna configurations at receiver and transmitter, multiple access can exploit multiple-input multiple-output (MIMO) mode of communication.

A variant of FDM is orthogonal frequency division multiplexing (OFDM) which effectively partitions the overall system bandwidth into multiple orthogonal subcarriers. OFDM multiplexing facilitates orthogonal FDMA (OFDMA). These subcarriers may also be referred to as tones, bins, or frequency channels. Each subcarrier can be modulated with data. With time division based techniques, each subcarrier can comprise a portion of sequential time slices or time slots. Each user may be provided with one or more time slot and subcarrier combinations for transmitting and receiving information in a defined burst period or frame. The hopping schemes may generally be a symbol rate hopping scheme or a block hopping scheme.

Code division based techniques typically transmit data over a number of frequencies available at any time in a range. In general, data is digitized and spread over available bandwidth, wherein multiple users can be overlaid on the channel and respective users can be assigned a unique sequence code. Users can transmit in the same wide-band chunk of spectrum, wherein each user's signal is spread over the entire bandwidth by its respective unique spreading code. This technique can provide for sharing, wherein one or more users can concurrently transmit and receive. Such sharing can be achieved through spread spectrum digital modulation, wherein a user's stream of bits is encoded and spread across a wide channel with a specific spreading factor in a pseudo-random fashion. The receiver is designed to recognize the associated unique sequence code and undo the randomization and spreading in order to collect control and traffic bits for a particular user in a coherent manner.

Regardless the peculiarities of a wireless communication system, subscriber perceived quality of service and communication session quality depend, at least in part, on adequate management of available communication resources—e.g., time resources such as radio frame configuration; frequency resources, like licensed bands, available system bandwidth and subcarriers; and transmission power which is a regulated resource. Such management depends substantially on wireless link, or channel, quality which is determined by signal strength and noise sources like interference, thermal noise, 1/f noise, timing noise, or phase noise; the noise sources are generally associated with conditions of the air interface and non-idealities of transceiver(s) electronic circuitry. Channel quality is typically conveyed among receiver and transmitter via channel quality indicator (CQI) reports. Availability and accuracy of such reports facilitates communication resource management at various levels: As an example, a transmitter generally schedules time-frequency resource grants and allocates transmission power to served subscriber stations in accordance with CQI received from the subscriber stations. As another example, terminal handover determinations are can be based at least in part on CQI reports. As yet another example, in MIMO mode of operation, availability of channel state information at the receiver dictates pre-coding matrices utilized to multiplex a data or signaling stream for a served terminal. Therefore there is a need in the art for algorithms to accurately determine CQI reports in wireless communications.

SUMMARY

The following presents a simplified summary in order to provide a basic understanding of some aspects of the disclosed innovation. This summary is not an extensive overview and is intended to neither identify key or critical elements nor delineate the scope of disclosed embodiments. Its purpose is to present some concepts of the described embodiments in a simplified form as a prelude to the more detailed description that is presented later.

The subject innovation provides system(s) and method(s) for generating phase-noise resilient generation of a channel quality indicator. A pilot signal utilized to determine a channel quality indicator is rotated to be aligned to a phase reference signal. Separate noise evaluations in quadrature and in-phase directions are utilized, at least in part, to generate a net noise estimate that is phase-noise compensated or resilient. For instance, net noise estimate can exploit various combination schemes, the schemes include weighted average of in-phase and quadrature noise estimates and running averages thereof. Simulation of net noise estimates as a function of geometry conditions reveal that the combination schemes provide substantive mitigation of the impact of phase-noise.

In an aspect, the subject innovation discloses a method comprising: evaluating an in-phase noise variance for a pilot signal in the presence of a phase noise; evaluating a quadrature noise variance for the pilot signal in the presence of the phase noise; and estimating a net noise variance for the pilot signal based at least in part on the evaluated in-phase noise variance or the evaluated quadrature noise variance.

In another aspect, the subject innovation discloses an apparatus comprising: means for rotating a pilot signal onto a phase reference signal; means for evaluating an in-phase noise for the rotated pilot signal in the presence of a phase noise; means for evaluating a quadrature noise for the rotated pilot signal in the presence of a phase noise; and means for estimating a net noise for the rotated pilot signal based at least in part on the evaluated in-phase noise and the evaluated quadrature noise.

In yet another aspect, the subject innovation describes a computer program product comprising a computer-readable medium including: code for causing a computer to rotate a pilot signal onto a phase reference signal; code for causing a computer to evaluate an in-phase noise variance for the rotated pilot signal in the presence of a phase noise; code for causing a computer to evaluate a quadrature noise variance for the rotated pilot signal in the presence of a phase noise; code for causing a computer to estimate a net noise variance for the pilot signal based at least in part on the evaluated in-phase noise variance or the evaluated quadrature noise variance; and; code for causing a computer to generate a channel quality indicator based at least in part on the estimated net noise variance.

In a further yet aspect, the subject innovation describes an electronic device in a wireless environment, the electronic component comprising: a processor configured to evaluate an in-phase noise for a pilot signal in the presence of a phase noise; to evaluate a quadrature noise for the pilot signal in the presence of a phase noise; to estimate a net noise for the pilot signal based at least in part on the evaluated in-phase noise or the evaluated quadrature noise; and a memory coupled to the processor.

To the accomplishment of the foregoing and related ends, one or more embodiments comprise the features hereinafter fully described and particularly pointed out in the claims. The following description and the annexed drawings set forth in detail certain illustrative aspects and are indicative of but a few of the various ways in which the principles of the embodiments may be employed. Other advantages and novel features will become apparent from the following detailed description when considered in conjunction with the drawings and the disclosed embodiments are intended to include all such aspects and their equivalents.

DETAILED DESCRIPTION

Figure 1:
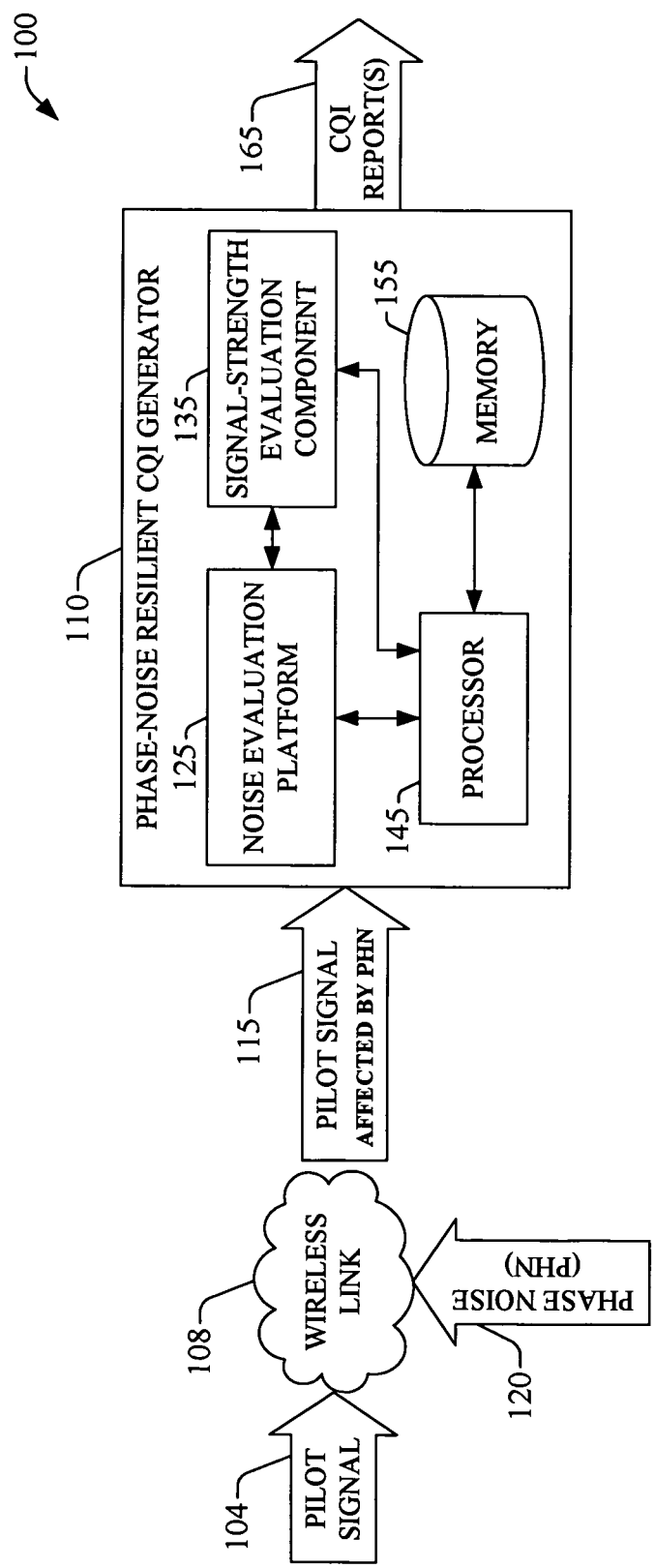
FIG. 1 is a block diagram of an example phase-noise resilient channel quality indicator (CQI) generator in accordance with aspects described in the subject specification.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

As used in this application, the terms "system," "platform," "component," "generator," and the like are intended to refer to a computer-related entity, either hardware, firmware, a combination of hardware and software, a combination of hardware and firmware, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Moreover, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Various embodiments are described herein in connection with a wireless terminal. A wireless terminal may refer to a device providing voice and/or data connectivity to a user. A wireless terminal may be connected to a computing device such as a laptop computer or desktop computer, or it may be a self contained device such as a personal digital assistant (PDA). A wireless terminal can also be called a system, a subscriber unit, a subscriber station, a mobile station, a mobile terminal, a mobile, a remote station, an access point, a remote terminal, an access terminal, a user terminal, a user agent, a user device, customer premises equipment, user equipment, a wireless device, a cellular telephone, a personal communication service (PCS) telephone, a cordless telephone, a session initiation protocol (SIP) telephone, a wireless local loop (WLL) station, a handheld device having wireless connection capability, or other processing device connected to a wireless modem.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), CDMA2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, CDMA2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range wireless communication techniques.

In addition, various embodiments disclosed in the subject specification relate to a base station. A base station may refer to a device in an access network that communicates over the air-interface, through one or more sectors, with wireless terminals, and with other base stations through backhaul wired or wireless network communication. The base station may act as a router between the wireless terminal and the rest of the access network, which may include an IP (internet protocol) packet-switched network, by switching received air-interface frames to IP packets. The base station also coordinates management of attributes for the air-interface. A base station may also be referred to as an access point (AP), Node B, home Node B, evolved Node B (eNodeB), evolved base station (eBS), access network (AN) or some other terminology.

As discussed in greater detail below, system(s) and method(s) are presented for generating phase-noise resilient generation of a channel quality indicator. A pilot signal utilized to determine a channel quality indicator is aligned, through a rotation, to a phase reference signal which can be a processed (e.g., filtered) version of the pilot signal. Separate quadrature and in-phase noise evaluations can be utilized to generate a net noise estimate that is phase-noise compensated or resilient. In an aspect of the subject innovation, in-phase and quadrature noise components are combined, or superposed, in accordance with various combination schemes. Illustrative examples of schemes can include (i) selection of the in-phase noise estimate while the quadrature component is suppressed in a combination; (ii) determination of a weighted average of in-phase and quadrature noise estimates, or their running averages over a predetermined time interval, wherein the weights in the weighted average are dictated by a threshold associated with a magnitude of a ratio of in-phase and quadrature running averages; and (iii) determination of a weighted average of an in-phase noise estimate and a compensated quadrature noise estimate. Simulations of net noise estimates as a function of geometry conditions reveal that the combination schemes provide substantive mitigation of phase-noise.

With respect to the drawings, FIG. 1 illustrates a block diagram 100 of an example phase-noise resilient channel quality indicator (CQI) generator 110. Pilot signal 104 is conveyed to phase-noise resilient CQI generator 110 through a wireless link in the presence of phase noise 120, which leads to a pilot signal 115 that is affected by the phase noise 120. Phase noise (PHN) can arise from various sources such as for example instability of transmitter(s) and receiver(s) local oscillator(s) (e.g., crystal oscillators, inductive oscillators, . . . ), and phase-locked loop (PLL) noise; instability generally associated with a tradeoff among an oscillator Q factor(s) and a desired degree of oscillator tunability. A noise evaluation platform 125 receives pilot signal 115 and quantifies noise so as to compensate distortion of noise estimates for traffic channels that are determined through pilot signal 115 in control signaling channels (e.g., common pilot channel (CPICH), either primary of secondary, in UTRA downlink). Such distortions are generally originated by phase noise 120. To generate CQI report(s) 165, a signal-strength evaluation component 135 determines channel, or radio link, signal strength via through one or more performance metrics, and receives a noise estimate from noise evaluation platform 125. The performance metrics include: a reference signal received power (RSRP), which indicates signal strength ($E_s$) and reveals DL path loss, or attenuation, associated with attenuation of radiation conveyed in DL physical channels; a reference signal strength indicator (RSSI), which typically conveys the effects of interference, indicating the strength of a signal relative to average background noise, the measured background noise can include intra-cell and inter-cell interference. Signal strength evaluation component 135 exploits metrics RSRP and RSSI in combination with received noise estimate(s) to establish channel condition(s) metrics, such as carrier to interference ratio (C/I), or signal to noise ratio (SNR); reference signal over thermal noise (RSOT), typically conveyed as $E_s/N_0$. Derived metrics such as signal to noise and interference ratio (SINR) can also be employed to determine a channel condition metric. Supplemental information such as desensitization factors can also be conveyed to signal-strength evaluation component 135. It is to be noted that CQI reports are typically low-overhead messages, e.g., information is conveyed through a few (e.g., O(1)) bits. Moreover, it should be appreciated that phase-noise resilient CQI generator 110 can operate in a base station or in an access terminal.

Pilot signal 115 can be conveyed by a base station and received by a terminal, or by a terminal and received by a base station when communication is effected in a cellular wireless network, or from a terminal to a terminal when communication takes place in an ad hoc network. In addition, pilot signal 115 can comprise binary or complex symbols, wherein such symbols can be at least a portion of length-N (with N a positive integer) code sequences typically known to the receiver (e.g., a network device that comprises phase-noise resilient CQI generator 125). By way of non-limiting example, it is noted that code sequences can include pseudo-random codes or pseudonoise sequences, a Gold sequence, a Walsh-Hadamard sequence, an exponential sequence, a Golomb sequence, a Rice sequence, an M-sequence, a Kasami sequence, or a polyphase sequence such as a generalized chirp-like (GCL) sequence (e.g., Zadoff-Chu sequence). It is to be noted that polyphase sequences of length N are defined through the N-order roots of unity in the complex plane, and a family of N sequences, each determined in part by a root index $\mu=0, 2, \ldots N-1$.

Phase noise 120 typically affects output of local oscillator(s) (LO) that facilitate operation of wireless network devices. Such output in baseband complex form can be cast as $e^{j\theta(t)}$, where $j=\sqrt{-1}$ is the imaginary unit and $\theta(t)$ is a time-varying phase that represents the difference between a carrier phase and the phase of the LO output and is affected by phase noise. It should be appreciated that while the initial phase of the carrier can be assumed to be zero herein for simplicity, such scenario is generally attained through phase mismatch estimation and compensation when cell (re)synchronization is conducted. PHN specification of an oscillator (e.g., a voltage controlled oscillator, or a crystal oscillator) is often provided in frequency domain; however, a time-domain representation of a frequency-domain model of PHN, such as for example stationary model and Wiener model, can facilitate wireless system level analysis. When LO output is phase-locked, $\theta(t)$ can be modeled as a stationary PHN:

$$\theta(t) = \theta_o + \phi(t), \quad (1)$$

where $\theta_o$ is a constant phase difference, and $\phi(t)$ is a zero-mean, wide sense stationary (WSS), colored Gaussian process. For mobile station modem (MSM) chipsets, the PLL noise is the composite of outer and inner loop frequency tracking loop (FTL) noise. Since $\phi(t)$ is the "jitter" in a phase-locked oscillator, $\phi(t) \ll 1$ and therefore LO output $e^{j\theta(t)}$ in the presence of phase noise can be expanded as $$e^{j\theta(t)} = e^{j\theta_0}\left(1 + j\phi(t) - \frac{\phi^2(t)}{2} + \ldots\right). \quad (2)$$

Retaining terms up to first order in $\phi(t)$ in Eq. (2), power spectrum density (PSD) S(f) of the LO output can be approximated as $$S(f) \approx \delta(f) + S_\phi(f), \quad (3)$$

with f a frequency. Hence, S(f) is thus approximated by $S_\phi(f)$ except for the Dirac delta-function. In an aspect, LO output can have a Lorentzian spectrum, e.g., the shape of the magnitude of a one-pole low-pass filter transfer function. For a Lorentzian PHN model, the autocorrelation of PHN $\phi(t)$ is $$R_\phi(\tau) = \sigma_\phi^2(f)e^{-\gamma|\tau|}, \quad (4)$$

wherein $\sigma_\phi^2$ is the variance of PHN and $\alpha$ determines the 3 dB bandwidth of the PHN power spectrum density. In frequency-domain, PSD for a Lorentzian PHN is $$S_\phi(f) = \frac{\left(\frac{\sigma_\phi^2}{\pi B_\phi}\right)}{\left(1 + \left(\frac{f}{B_\phi}\right)^2\right)}, \quad (5)$$

wherein $B_\phi = \gamma/2\pi$. It is clear from the above that the parameters describing the stationary PHN are $\sigma_\phi^2$ and $\gamma$, or $B_\phi$. It is noted that Eq. (4) and (5), disregard a noise floor in the phase-noise PSD; however, noise floor can be straightforwardly included by adding a $\delta$-function in $R_\phi(\tau)$ or a constant in $S_{100}(f)$.

In an aspect, phase noise can be modeled as a narrowband low-pass random process on the phase of a received pilot symbol within pilot signal 115 or substantially any received signal. As an example, the effects of phase noise on received orthogonal variable spreading factor code(s) associated with either a pilot signal 115 or a traffic channel is discussed next. The following notation is utilized throughout the subsequent illustration.

Number of orthogonal variable spreading factor (OVSF) codes: L
    Spreading factor of code l: $k_l$ with $l=0, \ldots, L$
    Spreading codes sequence: $a_l(n)$ with $n=0, \ldots, k_l-1$
    Chip energy of code l: $E_l$
    Modulated symbol on code l: $S_l(m)$, $m=0,1,\ldots$
    Scrambling code sequence: C(n)
    Chip-rate noise sequence: v(n), which can be white complex Gaussian
    Received phase reference: $\theta$
    Chip-rate phase noise sequence: $\phi(n)$ It should be appreciated that time sequences, code sequences, and substantially all parameters relevant to a model of phase noise can be stored in memory 155, and can be utilized by noise evaluation platform, through processor, to execute substantially all computations associated with the model.

The received chip sequence (e.g., pilot symbol(s) within pilot signal 115) is:

$$r(n) = e^{j\theta}e^{j\phi(n)}C(n)\sum_{l=0}^{L-1}\sqrt{E_l}\,a_l(\mathrm{mod}(n, k_l))S_l\left(\left\lfloor\frac{n}{k_l}\right\rfloor\right) + v(n). \quad (6)$$

After descrambling and projection (e.g., dot/cross product) onto a phase reference, the received sequence becomes:

$$r'(n) = r(n)C(n)e^{-j\theta} \quad (7)$$

$$= e^{j\phi(n)}\sum_{l=0}^{L-1}\sqrt{E_l}\,a_l(\mathrm{mod}(n, k_l))S_l\left(\left\lfloor\frac{n}{k_l}\right\rfloor\right) + v(n)C(n).$$

It is to be noted that $\lfloor\cdot\rfloor$ represents a floor function. It is also to be noted that processor 145 is configured to execute at least a portion of the descrambling and projection. After despreading, which can also be carried out at least in part by processor 145, estimated symbols on code i can be obtained; for instance, zero-th symbols is:

$$\hat{s}_i(0) = \frac{1}{k_i}\sum_{n=0}^{k_i-1}r'(n)a_i(n) \quad (8)$$

$$= \frac{1}{k_i}\sum_{n=0}^{k_i-1}\sum_{l=0}^{L-1}e^{j\phi(n)}\sqrt{E_l}\,a_l(\mathrm{mod}(n, k_l))a_i(n)S_l\left(\left\lfloor\frac{n}{k_i}\right\rfloor\right) +$$

$$\frac{1}{k_i}\sum_{n=0}^{k_i-1}v(n)C(n)a_i(n)$$

$$= s_i(0)\sqrt{E_i}\sum_{n=0}^{k_i-1}e^{j\phi(n)} +$$

$$\frac{1}{k_i}\sum_{\substack{l=0,\\l\neq i}}^{L-1}\sqrt{E_l}\sum_{n=0}^{k_i-1}e^{j\phi(n)}a_l(\mathrm{mod}(n, k_l))a_i(n)S_l\left(\left\lfloor\frac{n}{k_l}\right\rfloor\right) +$$

-continued $$\frac{1}{k_i}\sum_{n=0}^{k_i-1} v(n)C(n)a_i(n)$$

$$\approx s_i(0)\sqrt{E_i}\left(1-\frac{1}{2}\sum_{n=0}^{k_i-1}\phi^2(n)\right)+s_i(0)\sqrt{E_i}\sum_{n=0}^{k_i-1}j\phi(n)+$$

$$\frac{1}{k_i}\sum_{\substack{l=0,\\l\neq i}}^{L-1}\sqrt{E_l}\sum_{n=0}^{k_i-1}\left(1-\frac{1}{2}\sum_{n=0}^{k_i-1}\phi^2(n)+j\phi(n)\right)a_l(\mathrm{mod}(n,k_l))$$

$$a_i(n)S_l\left(\left\lfloor\frac{n}{k_l}\right\rfloor\right)+\frac{1}{k_i}\sum_{n=0}^{k_i-1}v(n)C(n)a_i(n)$$

Approximate expression for symbol $\hat{s}_i(0)$ exploits a second order expansion of $e^{j\Theta(n)}$ and can be further simplified in view of orthogonality of OVSF code(s):

$$\hat{s}_i(0)\approx s_i(0)\sqrt{E_i}\left(1-\frac{1}{2}\sum_{n=0}^{k_i-1}\phi^2(n)\right)-$$

$$\frac{1}{2k_i}\sum_{\substack{l=0,\\l\neq i}}^{L-1}\sqrt{E_l}\sum_{n=0}^{k_i-1}\sum_{n=0}^{k_i-1}\phi^2(n)a_l(\mathrm{mod}(n,k_l))a_i(n)S_l\left(\left\lfloor\frac{n}{k_l}\right\rfloor\right)+$$

$$s_i(0)\sqrt{E_i}\sum_{n=0}^{k_i-1}j\phi(n)+$$

$$\frac{1}{k_i}\sum_{\substack{l=0,\\l\neq i}}^{L-1}\sqrt{E_l}\sum_{n=0}^{k_i-1}j\phi(n)a_l(\mathrm{mod}(n,k_l))a_i(n)S_l\left(\left\lfloor\frac{n}{k_l}\right\rfloor\right)+$$

$$\frac{1}{k_i}\sum_{n=0}^{k_i-1}v(n)c(n)a_i(n)$$

$$=F_1+F_2+F_3+F_4+F_5$$

Term $F_1$ comprises the desired signal symbol. It is to be noted that phase noise results in desensitization of signal strength by a factor of $$-\frac{1}{2}\sum_{n=0}^{k_i-1}\phi^2(n).$$

Term $F_5$ contains the despread channel wideband noise, which is suppressed through despreading. Variance of $F_5$ decreases as $$\frac{1}{k_i}.$$

Due to phase noise, signal leaks to the quadrature direction as shown in $F_3$. The leakage is proportional to the signal strength. Thus, the ratio of this leakage to channel noise increases linearly with geometry, wherein geometry refers to ratio between total received transmission power and interference power at a receiver (e.g., an access terminal). The latter illustrates the reason phase noise effects are substantive at high geometry conditions.

Terms $F_3$ and $F_4$ represent a rise of noise level due to PHN, while $F_3$ represents the contribution from the same code, and scales with the signal strength.

Additionally, in $F_3$ the integration-and-dump operation is equivalent to a low-pass filtering operation followed by down-sampling. The low-pass filtering does very little in suppressing the narrow-band low-pass phase noise process, while it substantially suppresses white background noise (see $F_5$). As a result, degradation in SNR is more significant for OVSF channels with large spreading gain. It is to be noted that ratio of $F_3$ to channel noise increases linearly with spreading factor $k_i$.

As an example, CPICH is typically spread with a SF=256, whereas HS-PDSCH is spread with a SF=16. Such a substantive disparity in spreading gain between the two channels underpins CQI-BLER misalignment, or distortion, in the presence of phase noise.

It is to be noted that in the presence of phase noise, OVSF coded signals are not orthogonal to each other. As a result, revealed in $F_4$, the despread symbols experience interference from, or are "polluted" by, other OVSF channels. Such interference, can be interpreted as process $\phi(n)$ filtered with a finite impulse response (FIR) filter with impulse response $a_i(\mathrm{mod}(-n,k_l))\cdot a_i(-n), n=-\min(k_l,k_i),\ldots,0$, downsampled, and modulated with symbols on code l. It should be appreciated that in FIR filter taps $a_i(\mathrm{mod}(-n,k_l))\cdot a_i(-n), n=-\min(k_l,k_i),\ldots,0$, there are equal number of 1s and −1s values and thus the filter can be viewed as a high-pass filter. As $\phi(n)$ is a low-pass process, we conclude that this filtering suppresses $\phi(n)$. The latter is the reason $F_3$ dominates term $F_4$. It should be further appreciated that smaller $\min(k_l,k_i)$ lead to a smaller contribution to decoded symbol from $F_4$. Alternatively interpreted, for a narrower FIR filter, $\phi(n)$ varies less appreciably within the filter length and more efficient cancellation occurs. Therefore, effects of $F_4$ are substantially more significant for codes with large spreading factors, which reveal PHN affects CPICH more markedly than HS-PDSCH; and among codes that inflict interference, the codes with larger spreading factors contribute more significantly. In instances when interfering codes with same spreading factor than the demodulated codes, e.g., $k_l=k_i$, the neighboring codes of code i can generate substantially the most significant interference. Such codes share the same parents or grandparents with code i, and thus when such interference occurs, sequence $a_i(\mathrm{mod}(-n,k_l))\cdot a_i(-n), n=-\min(k_l,k_i),\ldots,0$ can be encompass a substantially small number of distinct, equal-length blocks of 1 and −1 symbols. Accordingly, these filters have the least suppression ability out of filters derived from length $k_i$ codes, as the distance of pairs of 1 and −1 are maximized.

Substantially the same foregoing interpretations regarding $F_4$ can be extended to $F_2$. It is to be noted that $F_2$ is second-order with respect to contributions from $F_3$.

In view of the foregoing analysis of contributions $F_1$ through $F_5$ to decoded symbol $\hat{s}_i(0)$, the following salient illustrative aspects emerge. (i) PHN increases noise level of OVSF codes, and in-phase contributions of PHN to noise level of the OVSF codes originates from at least two sources: self-interference and interference from disparate codes that fail to be orthogonal due to the presence of phase noise. (ii) Self-interference lies on the quadrature direction of modulated symbol, and dominates in codes conveyed with high power, like channels with typically deep penetration such as for example paging channel, and broadcast channel. Alternatively interpreted, a noise level increase is substantially present on the quadrature direction of modulated symbols. Interference from disparate codes lies on both in-phase and quadrature directions for modulated symbols (e.g., modulated in accordance with quadrature phase shift keying). (iii) Increase of noise level on OVSF codes increases nearly linearly with code spreading factor. Thus, in a communication system like UTRA, the increase is substantially higher on the pilot channel(s) (e.g., CPICH) than on traffic (e.g., HS-PD-SCH) channels.

To facilitate utilization of the foregoing model for phase noise model, as well as substantially any other model that provides a systematic approach to quantify noise, and to evaluate signal strength through computation and measurements, processor 145 is configured to execute at least a portion of a set of acts included in a set of methods or algorithms for noise estimation and signal strength determination. Memory 155 can retain noise and signal strength estimates, and can also store data structures, methods, algorithms, and associated instruction code(s) that facilitate to perform noise and signal strength evaluations and estimations.

An example architecture for noise evaluation platform 125 is discussed in connection with FIG. 2.

Figure 2:
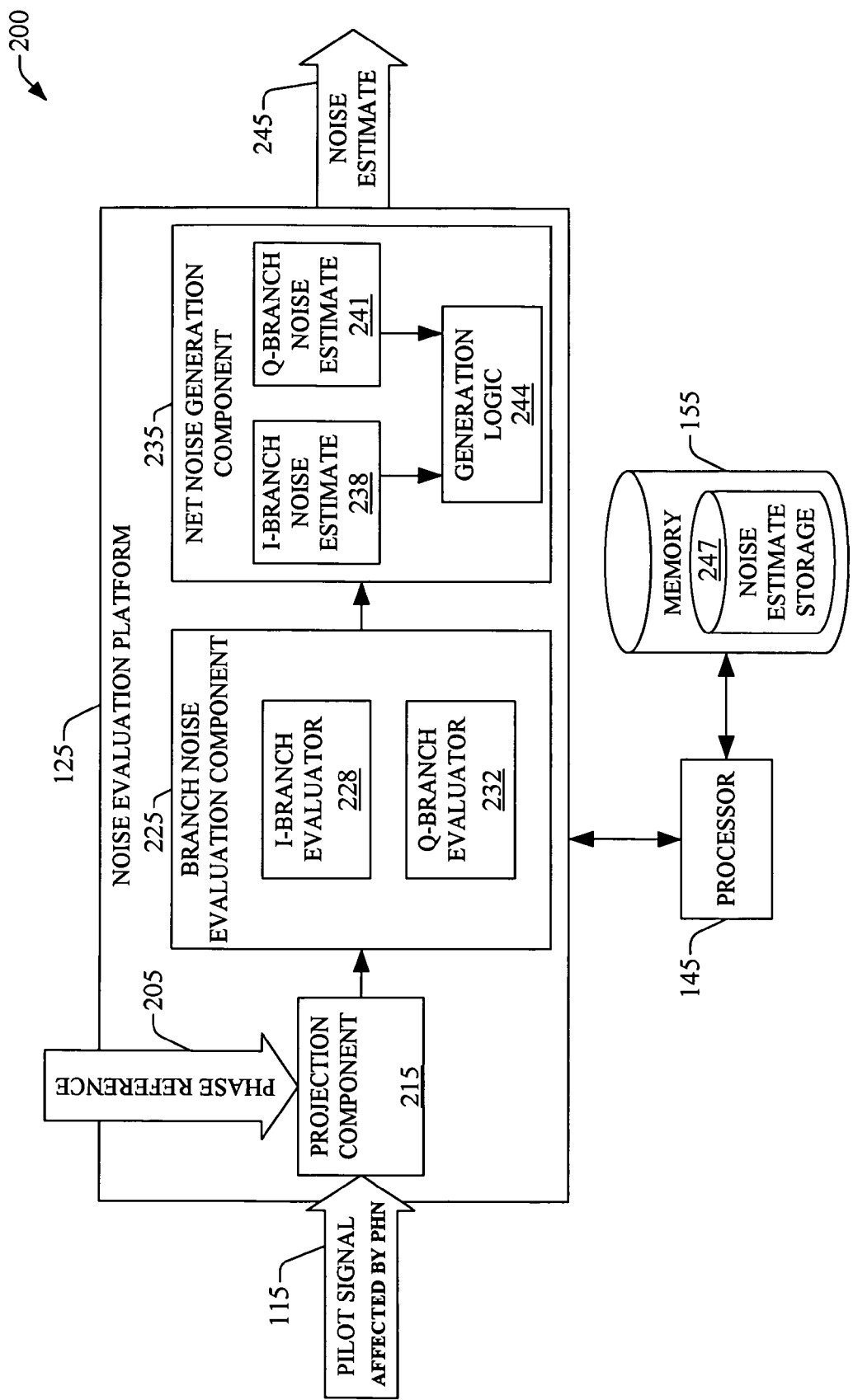
FIG. 2 illustrates a block diagram of an example noise evaluation platform in accordance with aspects described herein.

FIG. 2 illustrates a block diagram 200 of an example architecture of noise evaluation platform 125. A projection component 215 receives pilot signal 115, which as affected by PHN, and a phase reference 205, which in an aspect can be a filtered or averaged version of pilot signal 115. In an example, in UTRA, a mobile station can utilize either the primary or secondary CPICH. Projection component 215 rotates pilot signal 115 to remove a residue phase of pilot symbol(s). Rotation is accomplished through scalar and cross product operations which projection component 215 can effect via processor 145. Rotated pilot signal (e.g., chip(s) or symbol(s)) is conveyed to a branch noise evaluation component 225 that includes an in-phase branch (I-branch) noise evaluator 228 and a quadrature branch (Q-branch) noise evaluator 232. A net noise generation component 235 receives I-branch noise estimate 238 and Q-branch noise estimate 241 and applies a generation logic 244 to generate a net noise estimate 245. I-branch, Q-branch and net noise estimates can be stored in noise estimate storage 247, to support combination logic and substantially any other functionality in a wireless device that relies at least partially on noise estimates, e.g., scheduler allocation of transmission power in accordance with noise due to intra-cell and other-cell interference. Processor 145 is configured to execute, at least in part, code instructions for acts in algorithms or methods the facilitate projection of received signals, in-phase and quadrature noise quantification(s) and combination thereof.

Figure 3:
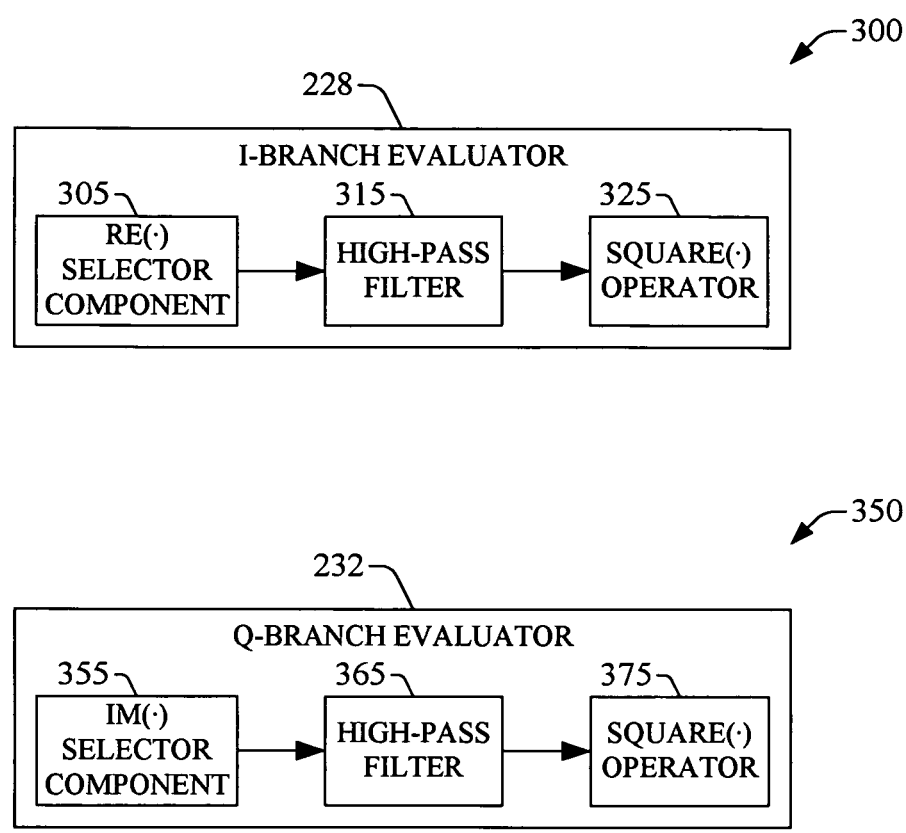
FIG. 3 illustrates block diagrams of example I-branch and Q-branch evaluators in accordance with aspects disclosed in the subject specification.

FIG. 3 illustrates block diagrams 300 and 350 of example I-branch evaluator component 228 and example Q-branch evaluator component 232, respectively. Such evaluator components can each comprise three components: First, Q-branch evaluator component 228 includes an imaginary part (Im(•)) selector component 305 that computes noise in-phase terms within a model of phase noise, such as the model illustrated above in connection with FIG. 1, and conveys computed in-phase terms to high-pass filter 315 which suppresses low-pass components of $$\sum_{n=0}^{k_j-1} \phi(n).$$

A Q-branch noise estimate (e.g., estimate 238) is computed via square function (square(•)) operator 325. It is noted that in an alternative, or additional, embodiment an estimation of Q-branch noise component can be performed without utilization of high-pass filter 315. Second, I-branch evaluator component 232 includes a real part (Re(•)) selector component 355 that computes noise quadrature terms within a model of phase noise, such as the model illustrated above in connection with FIG. 1, and conveys computed in-phase terms to high-pass filter 315 which renders the quadrature estimation to a zero-mean estimate and removes, for example, term $F_1$ in the foregoing PHN model. An I-branch noise estimate (e.g., estimate 241) is computed via square function (square(•)) operator 375.

Figure 4A:
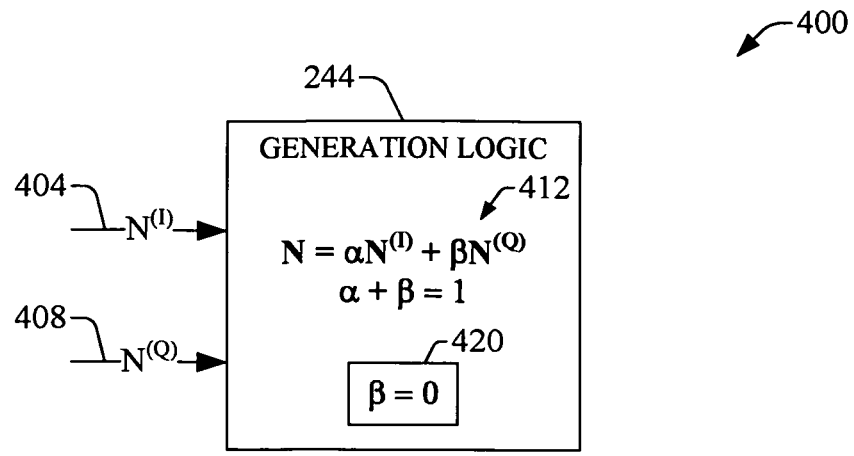
FIGS. 4A-4C illustrate example of combination logic that can be employed to combine I-branch and Q-branch noise estimates in accordance with aspects described herein.
Figure 4B:
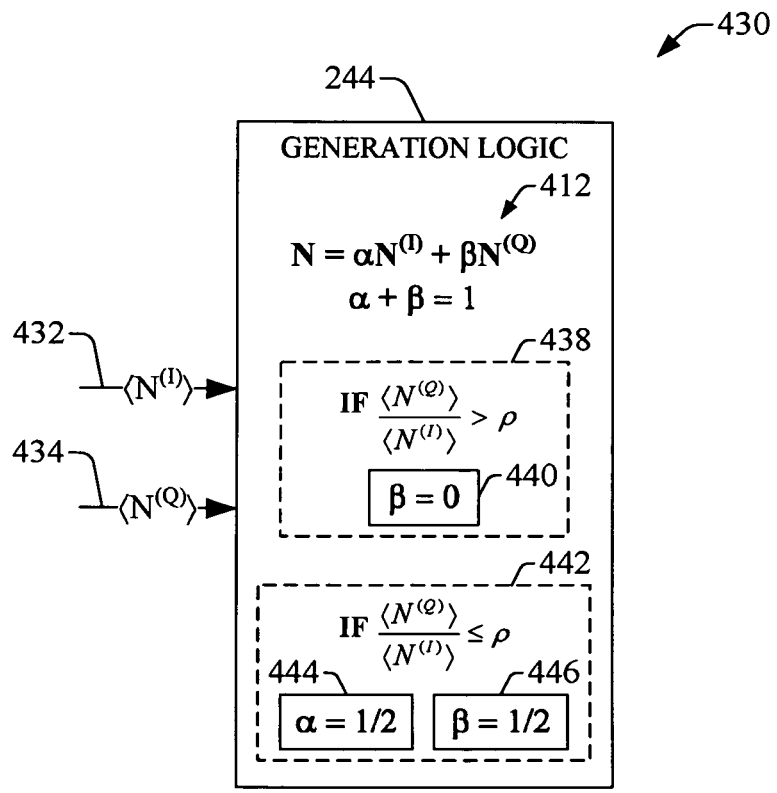
Figure 4C:
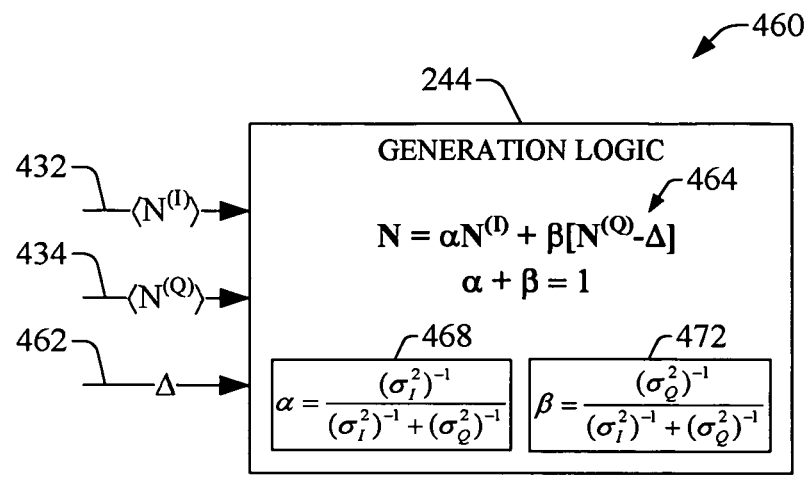

For non-limiting illustration purposes, FIGS. 4A through 4C are diagrams of examples of generation logic 244 that can be employed to utilize I-branch noise estimate 238 and Q-branch noise estimate 241 to generate a net noise estimate 245. It should be appreciated that generation logic 244 can exploit substantially any functional $\Im(f(N^{(1)}),g(N^{(Q)}))$ based at least in part on in-phase ($N^{(I)}$) and quadrature ($N^{(Q)}$). In an aspect of the subject innovation, are presented in the illustrated examples, a combination of I-branch noise component and Q-branch noise component is utilized: Net noise estimate N is a weighted average 412 of I-branch noise estimate $N^{(I)}$ 404 and Q-branch noise estimate $N^{(Q)}$ 408; e.g., $N=\alpha N^{(I)}+\beta N^{(Q)}$ with $\alpha+\beta=1$. FIG. 4A is a diagram 400 of an example generation logic 244 that receives $N^{(I)}$ 404 $N^{(Q)}$ 408, and utilizes in-phase branch noise estimate to generate a net noise estimate 412; e.g., parameter β 420 equals zero. When phase noise contribution to the net noise estimate N 412 is modeled as an unknown parameter, the generation logic 244 in diagram 400 can be proven to be the maximum-likelihood estimation method.

FIG. 4B is a diagram 430 of an example combination logic 234 that is threshold based. Running averages over a time interval Δt of I-branch noise estimate $\langle N^{(I)} \rangle$ 432 and Q-branch noise estimate $\langle N^{(Q)} \rangle$ 434 are received by generation logic 244; in an aspect, historic data stored in noise estimate storage 247 can be utilized by processor 145 to compute running averages. In an aspect, when phase noise resilient CQI generator 110 operates in a mobile station, the historic data typically is generated in accordance with a time-dependent reception of pilot symbol(s) in pilot signal 115 that is dictated by CQI reporting directives set by a serving base station. Utilization of running averages can increase estimation accuracy. Generation logic 244 can establish a first criterion 438 which determines that when ratio $\langle N^{(Q)} \langle / \rangle N^{(I)} \rangle$ is above a threshold 92 , parameter β 440 equals zero and Q-branch noise estimate is disregarded. Alternatively, generation logic 244 can establish a second criterion 438 which determines that when $\langle N^{(Q)} \langle / \rangle N^{(I)} \rangle \leq \rho$, parameter α 444 equals ½ and parameter β 446 equals ½, so the net noise estimate 412 reduces to the average of I-branch and Q-branch noise estimates. Optimal selection of parameters Δt and ρ can result in greater accuracy of this example logic when compared to example logic 400 (e.g., I-branch based noise estimation).

In an aspect, combination component can rely on artificial intelligence to determined optimal values of time interval Δt and threshold ρ. To that and other ends related to adaptation or optimization in other portions of the subject description associated with additional functionalities of the subject innovation, the term "intelligence" refers to the ability to reason or draw conclusions about, e.g., infer, the current or future state of a system based on existing information about the system. Artificial intelligence can be employed to identify a specific context or action, or generate a probability distribution of specific states of a system without human intervention. Artificial intelligence relies on applying advanced mathematical algorithms—e.g., decision trees, neural networks, regression analysis, cluster analysis, genetic algorithms, and reinforced learning—to a set of available data (information) on the system.

In particular, to the accomplishment of the various automated aspects described above and other automated aspects relevant to the subject innovation described herein, an intelligent component (not shown) can employ one of numerous methodologies for learning from data and then drawing inferences from the models so constructed, e.g., Hidden Markov Models (HMMs) and related prototypical dependency models, more general probabilistic graphical models, such as Bayesian networks, e.g., created by structure search using a Bayesian model score or approximation, linear classifiers, such as support vector machines (SVMs), non-linear classifiers, such as methods referred to as "neural network" methodologies, fuzzy logic methodologies, and other approaches that perform data fusion, etc.

FIG. 4C is a diagram 460 of an example combination logic that compensates phase noise induced bias in Q-branch and estimates a net noise through a weighted average of running averages for I-branch and Q-branch that utilizes optimal weights. Compensation of is effected via an offset Δ 462 that comprises contributions $F_2$ and $F_3$ and reflects a mismatch between computed running averages $\langle N^{(I)} \rangle$ 432 and $\langle N^{(Q)} \rangle$ 434. Processor 145 can computation Δ 462 through values of $F_2$ and $F_3$ stored in memory 155. Upon compensation, I-branch and Q-branch noise estimates possess the substantially the same mean but disparate standard deviations. In an aspect, optimal parameters α 468 and β 472 are, respectively, $$\alpha = \frac{(\sigma_I^2)^{-1}}{(\sigma_I^2)^{-1} + (\sigma_Q^2)^{-1}} \text{ and } \beta = \frac{\sigma_Q^{-1}}{\sigma_I^{-1} + \sigma_Q^{-1}},$$

wherein $\sigma_I$ and $\sigma_Q$ are the variances for I-branch estimates and Q-branch estimates, respectively. Variance of the combined estimates is $$\frac{1}{(\sigma_I^2)^{-1} + (\sigma_Q^2)^{-1}} = \sigma_I^2 \| \sigma_Q^2.$$

It is to be noted that due to the high-pass components of $$\sum_{n=0}^{k_j-1} \phi(n)$$

for high spreading factor codes, $\sigma_Q^2$ is always greater than $\sigma_I^2$. Utilization of historic data, compensation, and optimal combination generally results in improved net noise estimation accuracy.

In view of the example systems presented and described above, methodologies for generating phase-noise resilient channel quality indicator(s) that may be implemented in accordance with the disclosed subject matter will be better appreciated with reference to the flowcharts of FIGS. 5-9. While, for purposes of simplicity of explanation, the methodologies are shown and described as a series of blocks, it is to be understood and appreciated that the claimed subject matter is not limited by the number or order of blocks, as some blocks may occur in different orders and/or concurrently with other blocks from what is depicted and described herein. Moreover, not all illustrated blocks may be required to implement the methodologies described hereinafter. It is to be appreciated that the functionality associated with the blocks may be implemented by software, hardware, a combination thereof or any other suitable means (e.g., device, system, process, component, . . . ). Additionally, it should be further appreciated that the methodologies disclosed hereinafter and throughout this specification are capable of being stored on an article of manufacture to facilitate transporting and transferring such methodologies to various devices. It is to be noted that methodologies described herein may alternatively be represented as a series of interrelated states or events, such as in a state diagram. In addition, a methodology derived from a combination of at least portions of disparate methodologies may be represented as an interaction diagram, or call flow, rather than through flow chart(s).

Figure 5:
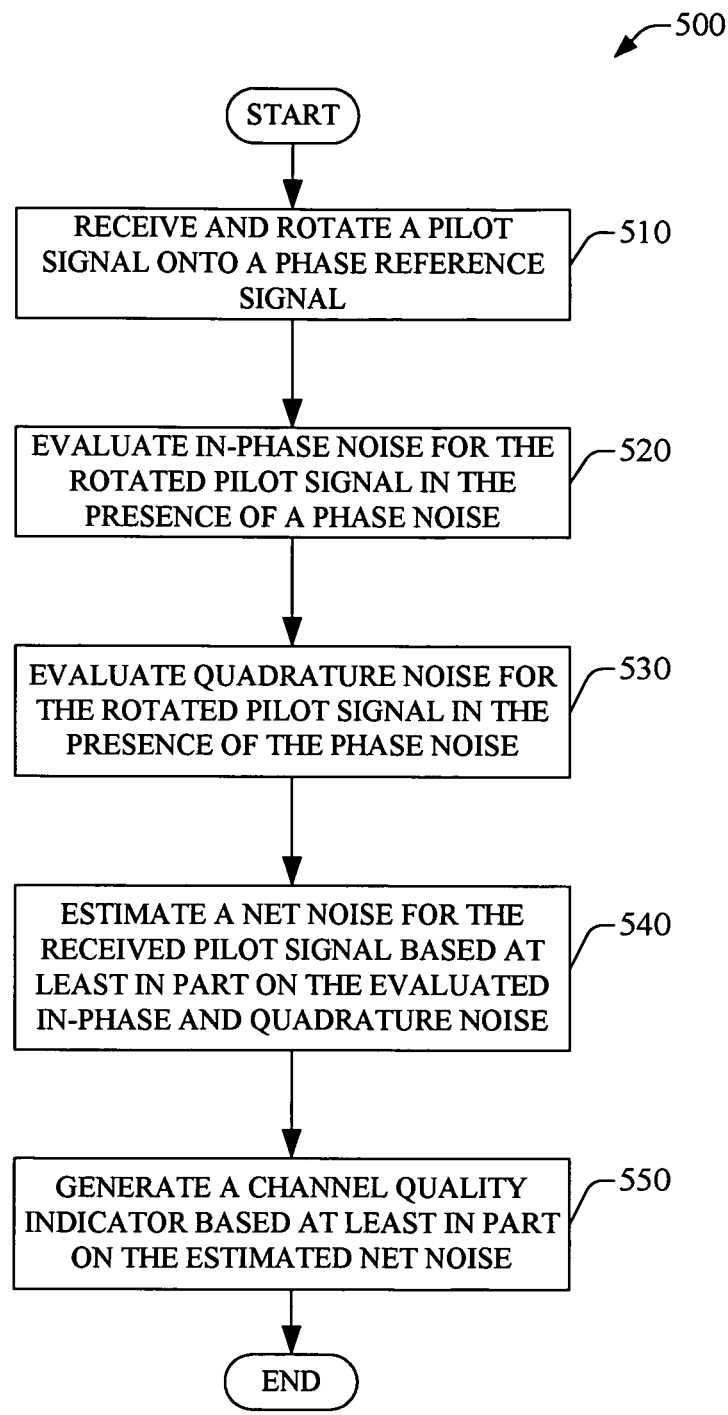
FIG. 5 presents a flowchart of an example method for generating phase noise resilient channel quality indicator reports according to aspects described herein.

FIG. 5 presents a flowchart of an example method 500 for generating phase noise resilient channel quality indicator reports. At act 510, a pilot signal affected by phase noise is received and rotated onto a phase reference signal. The reference signal can be a processed, e.g., averaged and filtered, instance of the received pilot signal. At act 520, an in-phase noise contribution (e.g., noise variance) for the rotated pilot signal is evaluated. Evaluation comprises application of a high-pass filter to the rotated pilot signal (e.g., chip(s) or symbol(s)). At act 530, a quadrature noise contribution (e.g., noise variance) for the rotated pilot signal is evaluated. In an aspect, evaluations in acts 520 and 530 can be effected by branch noise evaluation component 225 At act 540, a net noise estimate for the received pilot signal is estimated based at least in part on the evaluated in-phase and quadrature noise contributions. For example a net noise estimate can be generated through a combination, or superposition, of in-phase and quadrature noise contributions. It should be appreciated, however, that that substantially any functional $\Im(f(N^{(I)}), g(N^{(Q)}))$ based at least in part on in-phase ($N^{(I)}$) and quadrature ($N^{(Q)}$) noise components can be utilized to estimate net noise. At act 550, a channel quality indicator is generated based at least in part on the estimated net noise. Generation of the CQI also includes evaluation of signal strength of the received pilot symbol stream. For example, such evaluation can be accomplished through a signal-strength evaluation component 135.

Figure 6:
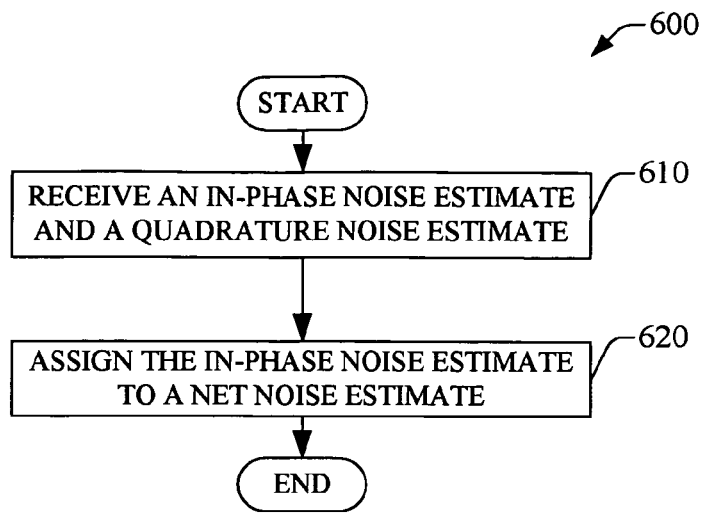
FIG. 6 presents a flowchart of an example method for estimating a net noise for a received pilot data stream by combining in-phase and quadrature noise estimates according to aspects disclosed in the subject specification.

FIG. 6 presents a flowchart of an example method 600 for estimating a net noise for a received pilot data stream by combining in-phase and quadrature noise estimates. In an aspect, example method can complement example method 500. Example method 600 can be employed when phase noise is assumed to be an unknown processor or time-sequence. At act 610, an in-phase noise estimate and a quadrature noise are received. Generation of such estimates can be accomplished, for instance, via I-branch evaluator 228 and Q-branch evaluator 232. At act 620, the received in-phase estimate is assigned to a net noise estimate. Act 620 can amount to a maximum likelihood (ML) estimation of net noise when phase noise is modeled as an unknown process.

Figure 7:
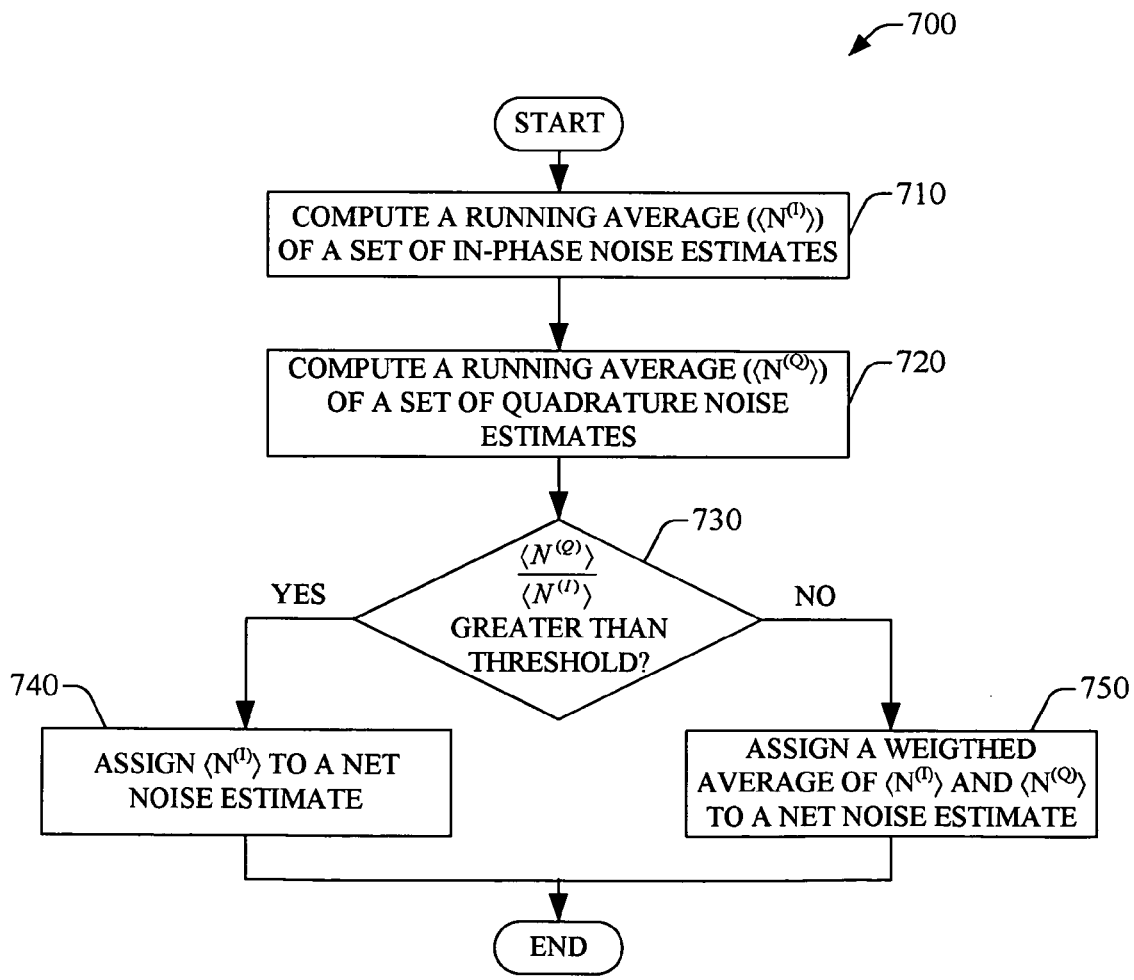
FIG. 7 presents a flowchart of an example method for estimating a net noise of a received pilot data stream by combining in-phase and quadrature noise estimates according to aspects described herein.

FIG. 7 presents a flowchart of an example method 700 for estimating a net noise of a received pilot data stream by combining in-phase and quadrature noise estimates. Example method 700 implements a combination according a threshold for a combination metric. At act 710, a running average $\langle N^{(I)} \rangle$ of a set of in-phase noise estimates is computed. Act act 720, a running average $\langle N^{(Q)} \rangle$ of a set of quadrature noise estimates is computed. Running averages in acts 710 and 720 spans a time interval that can be configured based at least on a target accuracy for the net noise. At act 730, ratio $\langle N^{(Q)} \rangle / \langle N^{(I)} \rangle$ is compared with a configurable threshold. The ratio is a combination metric. When the ratio is above threshold, $\langle N^{(I)}$ ⟩ is assigned to an estimate of net noise in act 740. Conversely, a weighted average of ⟨N$^{(Q)}$⟨ and ⟩N$^{(I)}$⟩ is assigned to a net noise estimate in act 750. In an example, weights adopt values equal to ½.

Figure 8:
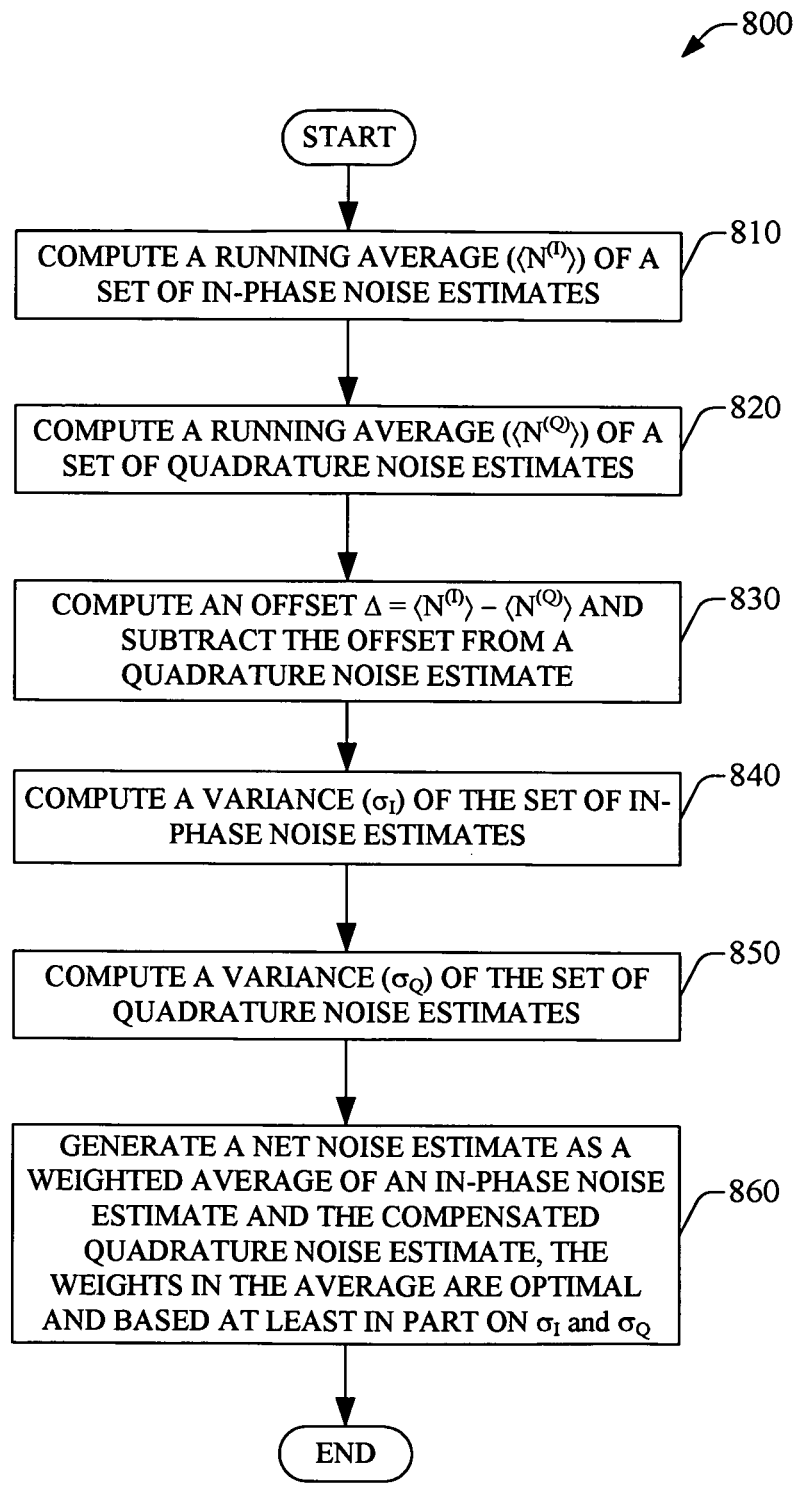
FIG. 8 presents a flowchart of an example method for estimating a net noise of a received pilot data stream by combining in-phase and quadrature noise estimates according to aspects described herein.

FIG. 8 presents a flowchart of an example method 800 for estimating a net noise of a received pilot data stream by combining in-phase and quadrature noise estimates. At act 810, a running average ⟨N$^{(I)}$⟩ of a set of in-phase noise estimates is computed. Act 820, a running average ⟨N$^{(Q)}$⟩ of a set of quadrature noise estimates is computed. Running averages in acts 810 and 820 spans a time interval that can be configured based at least on a target accuracy for the net noise. At act 830, an offset Δ=⟨N$^{(Q)}$⟩−⟩N$^{(I)}$⟨ is computed and subtracted from a quadrature noise estimate. A time span employed to compute running averages in acts 810 and 82 can be established according to a desired accuracy for a net noise estimate. At act 840, a variance $\sigma_I^2$ of the set of in-phase noise estimates is computed. Act 850, a variance $\sigma_Q^2$ of the set of quadrature noise estimates is computed. At act 860, a net noise estimate is generated as a weighted average of an in-phase noise estimate and the compensated quadrature noise estimate. Example optimal values for the weights that enter the average are the following:

$$w_I = \frac{(\sigma_I^2)^{-1}}{(\sigma_I^2)^{-1} + (\sigma_Q^2)^{-1}} \text{ and } w_Q = \frac{(\sigma_Q^2)^{-1}}{(\sigma_I^2)^{-1} + (\sigma_Q^2)^{-1}}.$$

Figure 9:
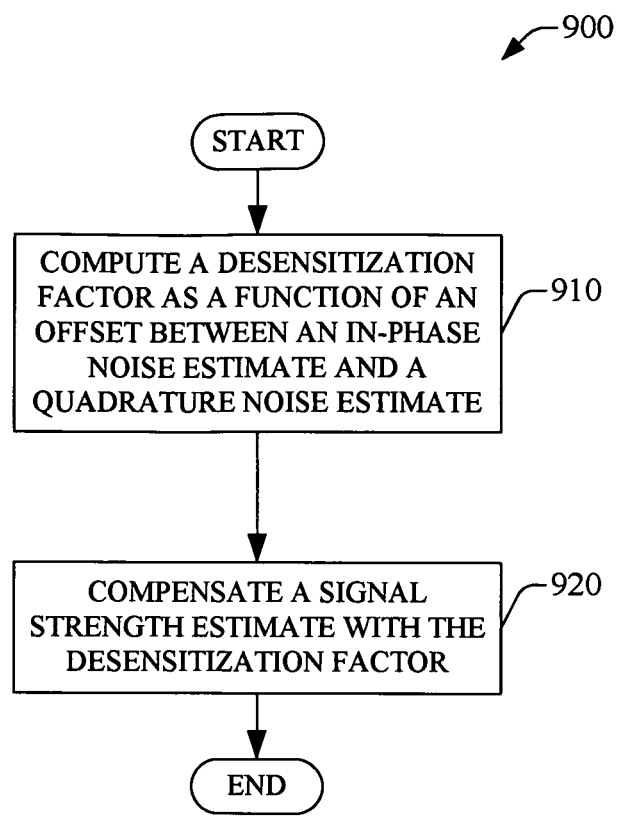
FIG. 9 presents a flowchart of an example method for adjusting an evaluated signal strength utilized in a phase-noise resilient generation of a CQI according to aspects disclosed herein.

FIG. 9 presents a flowchart of an example method 900 for adjusting an evaluated signal strength utilized in a phase-noise resilient generation of a CQI. In an aspect, example method 900 can complement example method 800. At act 910, a desensitization factor is computed as a function of an offset between an in-phase noise estimate and a quadrature noise estimate. In an aspect, for phase-noise fluctuations φ(t) up to second order, the desensitization factor is $$\Gamma = -\frac{1}{2}\sum_{n=0}^{k_l-1} \phi^2$$

(n) for a code l with spreading factor $k_l$. It should be appreciated that Γ adopts values that depend on the strength on phase-noise fluctuations, e.g., the order retained in an expansion with respect to the magnitude of φ(t), and on taking into account the operation of a high-pass filter on a PHN spectrum. At act 920, a signal strength evaluated to determine a CQI is compensated with the desensitization factor.

It is noted that the foregoing example methodologies 500 through 900 can be advantageously employed in power control. In power control, an access terminal estimates a DL signal-to-noise ratio and compares the estimate with a target value. Based at least in part on such comparison, the access terminal requests a serving base station for a power allocation adjustment (e.g., an increment or decrement). Example methodologies described herein can improve power control by improving accuracy of an estimation of a signal to interference ratio. As an illustration, improved estimation of SIR and substantially any performance metric that includes interference ratio can be particularly advantageous for fractional dedicated physical channel (F-DPCH) power control in High Speed Downlink Packet Access (HSDPA) within 3GPP UMTS. With F-DPCH, there is no BLER-based outer loop to correct substantially any bias of SNR estimation, and thus compensation of SNR estimation bias effectively is substantially necessary.

Simulations of net noise estimation for a range of geometries and in the presence of phase noise with various spectral characteristics (e.g., bandwidth, strength) are discussed below and illustrated in FIGS. 10A through 12B. Simulations are based on various methodologies for I-branch and Q-branch combining, including two (e.g., methods 600 and 800) of those described in the subject specification. Table I presents simulation parameters and their configurations. Phase noise spectrum model is Lorentzian with variable bandwidth. Communication channel is modeled as additive white Gaussian noise channel.

TABLE I

Simulation parameters and associated value or setup

| Parameter | Value/setup |
|---|---|
| Channel | AWGN |
| Geometry | [0:3:30] dB |
| Phase Noise Model | Lorentzian with variable bandwidth |
| High-pass filter | 1 − z$^{-1}$ |
| Average Operation | One pole IIR with gain 0.01 |
| Variance Estimator | ML over a long block of data |

With respect to phase noise strength, through simulations, a prototypical "worst case" scenario is assigned to estimation that delivers nearly 3 dB bias at approximately 15 dB geometry. "Typical" phase-noise scenario is adopted as estimation performance 10 dB better than the worst case scenario. In field operation, actual phase noise spectrum generally depends on architecture of base station, and spans a range of spectral levels. Analysis herein presents mean and variance of net noise estimates for a substantive volume of simulations. As a performance metric, a good net noise estimator should generate estimates with unbiased mean and small variance as a function of communication condition like geometry.

Figure 10A:
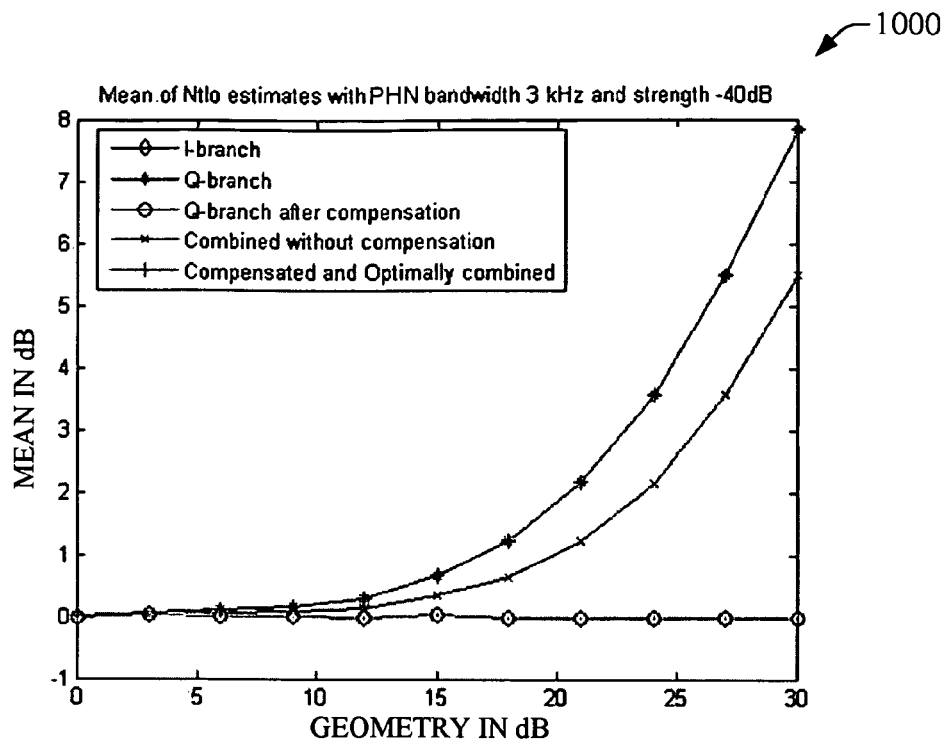
FIGS. 10A-12B display results of simulations for net noise estimation based on independent determination of in-phase and quadrature noise estimates for a range of geometries and different levels of phase noise bandwidth and strength.

FIG. 10A illustrates a mean of an estimated net noise for five disparate estimation methodologies as a function of geometry for PHN strength of −40 dB and bandwidth $\sigma_\phi$=3 KHz. For geometry conditions below 10 dB, net noise estimation based on I-branch, Q-branch, Q-branch after compensation (e.g., through subtraction of offset factor Δ), combined I-branch/Q-branch without compensation, and compensated estimation with optimal combining provide an unbiased net noise estimate mean. For geometry above 10 dB, estimations with Q-branch and combined I-branch/Q-branch without compensation deteriorate substantially, whereas the remaining estimation methodologies deliver a nearly unbiased net noise estimate mean.

Figure 10B:
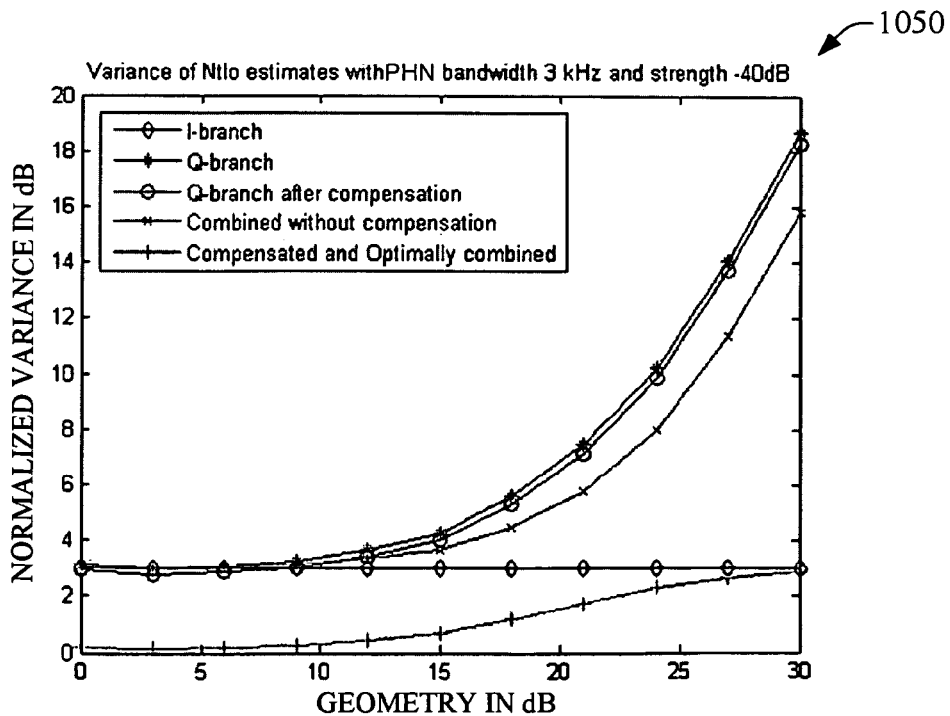

FIG. 10B illustrates normalized variance of net noise estimated with the foregoing five estimation methodologies and the same phase noise spectral properties as in FIG. 10A. For geometry below 10 dB, all five estimation methodologies provide with small variance, even though compensated estimation with optimal combining delivers the lowest variance. For geometry above 10 dB, Q-branch, Q-branch after compensation, and combined I-branch/Q-branch without compensation displays a deteriorated estimation performance. Simulations for this regime of PHN spectrum indicate that I-branch estimation (see example method 600) and compensated and optimally combined (see example method 800)

deliver substantially the most robust performance and generate unbiased net noise estimates with good accuracy.

Figure 11A:
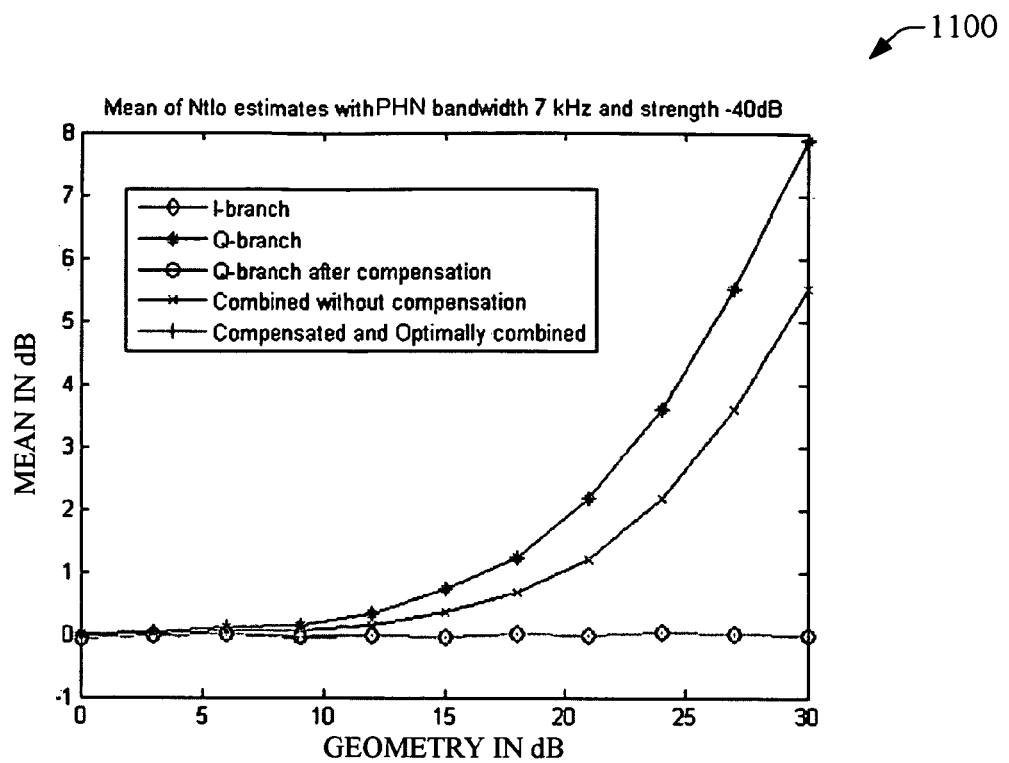
Figure 11B:
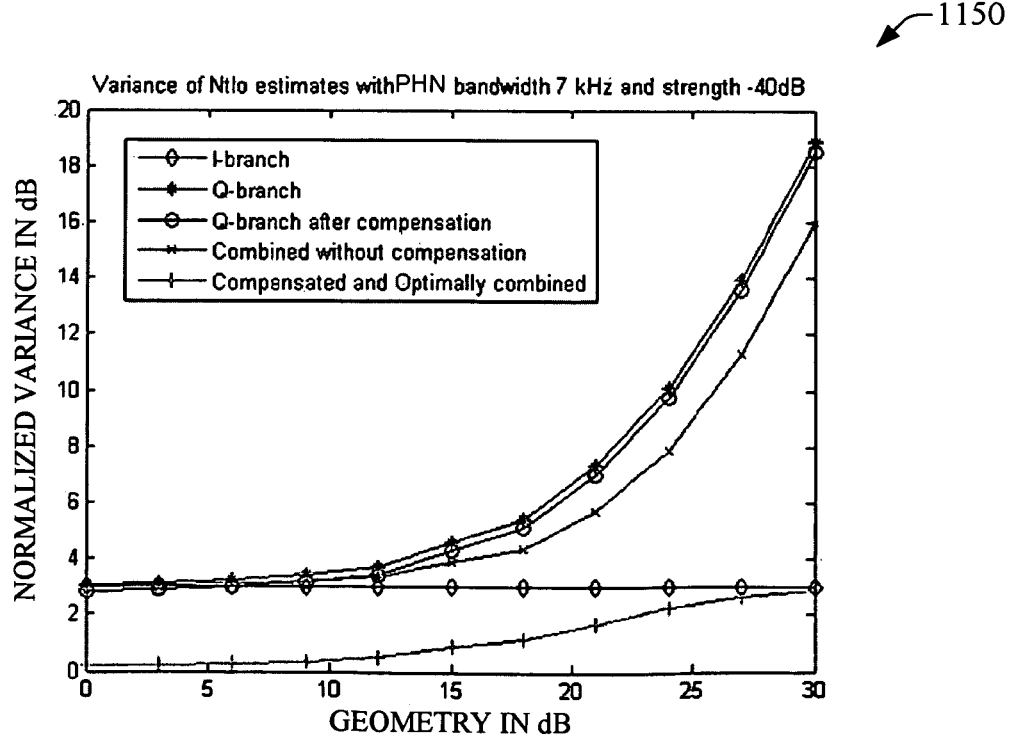

FIG. 11A and FIG. 11B illustrate, respectively, mean and variance of an estimated noise for PHN with bandwidth $\sigma_\phi=7$ KHz and strength of -40 dB. Trends are substantially the same as discussed in connection with FIGS. 10A and 10B. Simulations for this regime of PHN spectrum indicate that I-branch estimation and compensated and optimally combined methods generate unbiased net noise estimates with good accuracy.

Figure 12A:
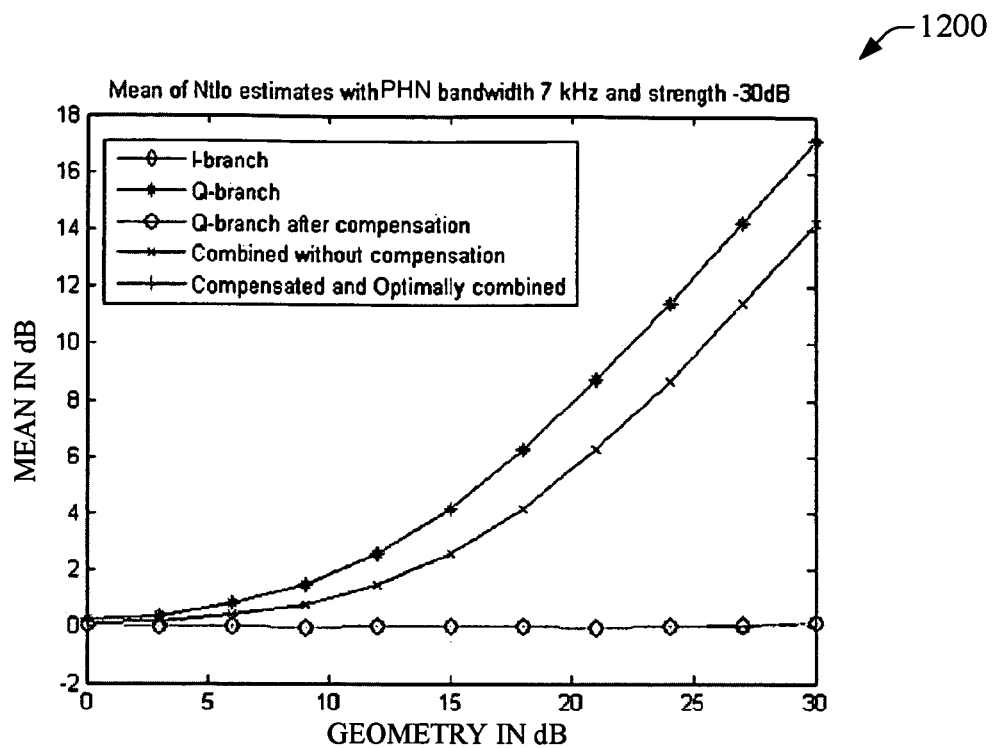
Figure 12B:
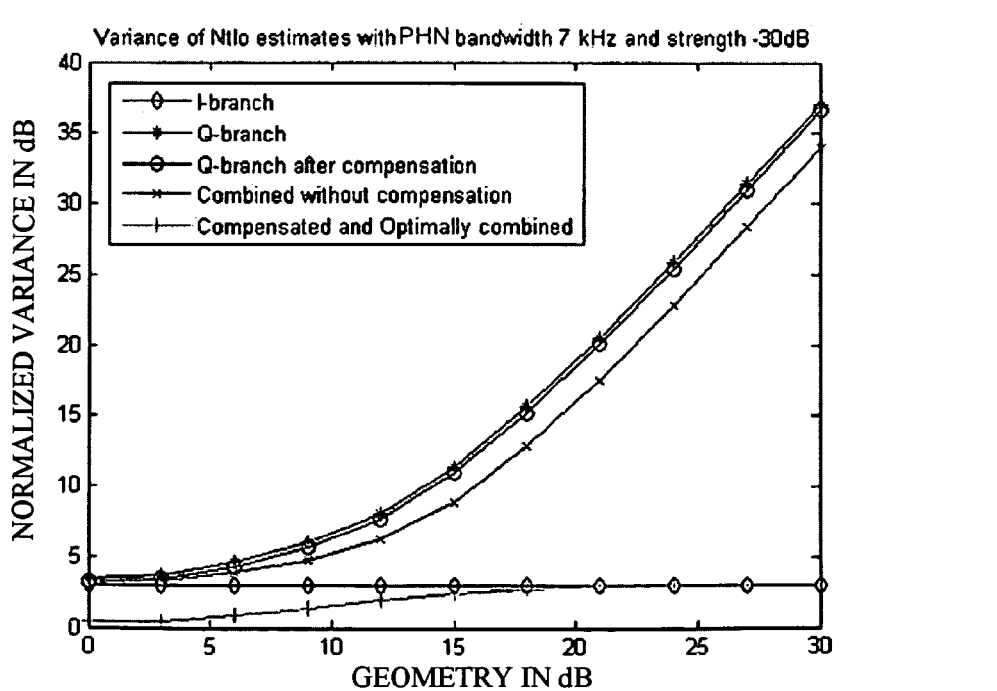

FIG. 12A and FIG. 12B illustrate, respectively, mean and variance of an estimated noise for PHN with bandwidth $\sigma_\phi=7$ KHz and strength of −30 dB. Trends are substantially the same as discussed in connection with FIGS. 10A and 10B, and FIGS. 11A and 11B as well. Simulations for this regime of PHN spectrum indicate that I-branch estimation and compensated and optimally combined methods generate unbiased net noise estimates with good accuracy.

It is to be noted that in the absence of compensation of phase noise afforded via the phase-noise resilient methodologies described herein for noise evaluation, CQI-BLER alignment can be substantially deteriorated high geometry conditions. In addition, I-branch/Q-branch combining effectively decreases the estimation errors in the region where phase noise fails to be significant and the gain decreases when phase noise becomes dominant on the Q branch. Simulations demonstrate proposed methodologies described herein effectively correct bias in net noise estimation as a result of phase noise.

Figure 13:
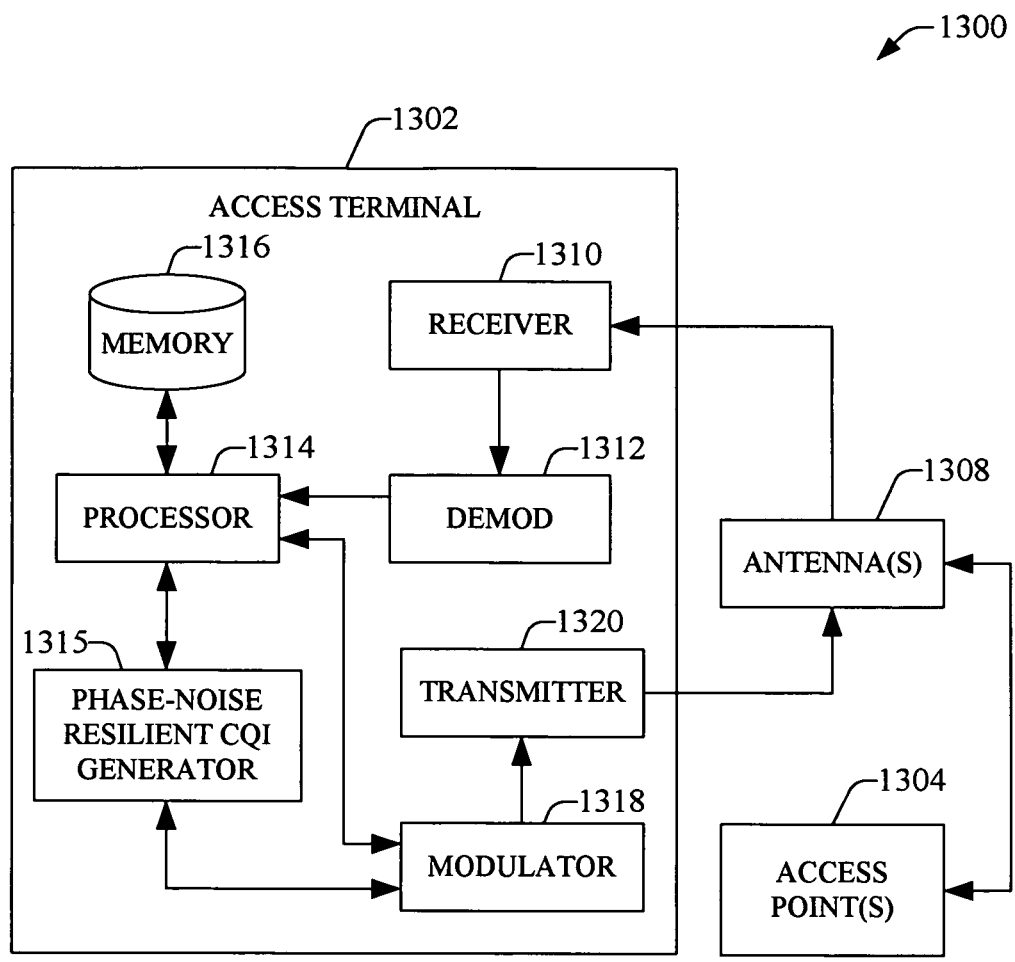
FIG. 13 is a block diagram of an example system that provides phase-resilient CQI reports in a wireless communication environment in accordance with various aspects described herein.

FIG. 13 is a block diagram of an example system 1300 that can generate phase-resilient CQI reports in a wireless communication environment in accordance with various aspects described herein. In example system 1300 such CQI reports can determine channel, or radio link, conditions in the downlink. Example system 1300 includes an access terminal 1302 which can receive signal(s) from access point(s) 1304, and transmit to the one or more access points 1304 via antenna(s) 1308. Multiple transmit and receive antennas can facilitate communication in multiple-input multiple-output mode of operation to attain increases data rates, and throughput and capacity. Access terminal 1302 can include a receiver 1310 or substantially any other electronic device that receives control signaling such as pilot symbols(s) streams, and traffic (which can be, for example, packet switched or circuit switched) from antenna(s) 1308. In an aspect, receiver 1310 can be functionally connected to a demodulator (Demod) 1312 that demodulates received information (e.g., signaling and traffic). Demodulated symbols can then be analyzed by processor 1314. Processor 1314 can be functionally coupled to a phase-noise resilient generator 1315 and memory 1316 which can store data or instruction codes related to operation and functionality of access terminal 1302. Additionally, access terminal 1302 can employ processor 1314, or substantially any other electronic processing device, to perform methodologies 500, 600, 700, 800, and 900, or substantially any other methodology associated with operation and functionality of phase-noise resilient CQI generator 1315 as described in the subject specification in order to provide phase-noise resilient generation of CQI reports. Access terminal 1302 can also include a modulator 1318 that can multiplex a signal for transmission by a transmitter 1320 via antenna(s) 1308 to access point(s) 1304.

Figure 14:
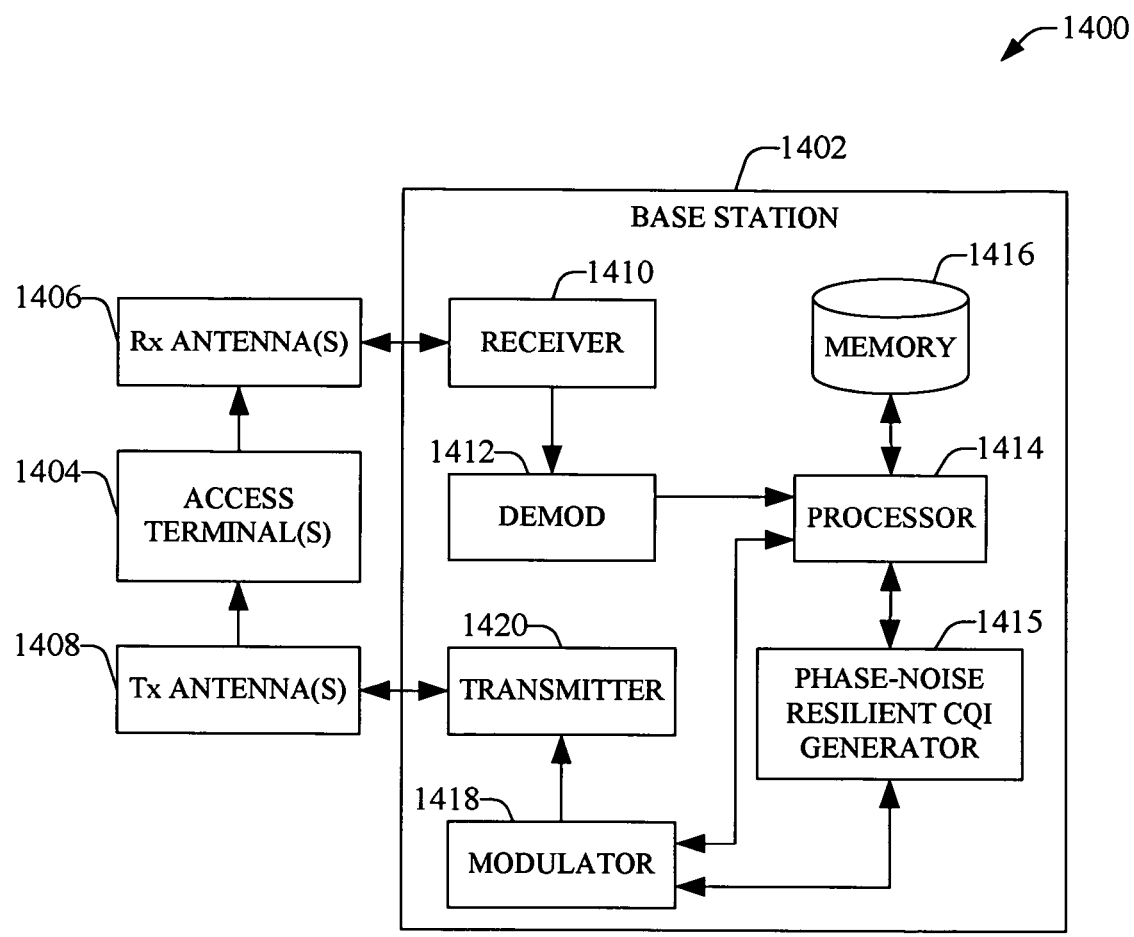
FIG. 14 is a block diagram of an example system that generates phase-noise resilient CQI reports in a wireless communication system in accordance with various aspects described herein.

FIG. 14 is a block diagram of an example system 1400 that can generate phase-noise resilient CQI reports in a wireless communication system in accordance with various aspects described herein. In example system 1400 such CQI reports can determine channel, or radio link, conditions in the uplink, via UL sounding reference signal(s). Example system 1400 includes a base station or access point 1402. As illustrated, base station 1402 can receive signal(s) (e.g., control and traffic) from one or more access terminals 1404 via receive (Rx) antenna(s) 1406, and transmit to one or more access terminals 1404 via transmit (Tx) antenna(s) 1408. Multiple transmit and receive antennas can facilitate communication in multiple-input multiple-output mode of operation to attain increases data rates, and throughput and capacity.

In addition, base station 1402 can comprise a receiver 1410 that receives information from receive antenna(s) 1406. In an aspect, receiver 1410 can be functionally connected with a demodulator (Demod) 1412 or substantially any other electronic device appliance that demodulates received information. Demodulated symbols can then be analyzed by a processor 1414. Processor 1414 can be functionally connected to a phase-noise resilient generator 1415 and to memory 1416 which can store information related to algorithms and methods for noise estimation, historic data for generation of running averages of in-phase and quadrature noise estimates, fro example. Moreover, memory can store code instructions and data structures for processor to execute methodologies 500, 600, 700, 800, and 900 to generate phase-noise resilient CQI reports. Furthermore, memory 1416 can store access terminals radio resource assignments and lookup tables related thereto, scrambling sequences for synchronization and pilot generation, OVSF codes, or other types of suitable information for operation of base station 1402. Base station 1402 can also include a modulator 1418 that can multiplex a signal for transmission by a transmitter 1420 through transmit antenna 1408 to one or more access terminals 1404.

Next, systems that can enable aspects of the disclosed subject matter are described in connection with FIG. 15. Such systems can include functional blocks, which can be functional blocks that represent functions implemented by a processor or an electronic machine, software, or combination thereof (e.g., firmware).

Figure 15:
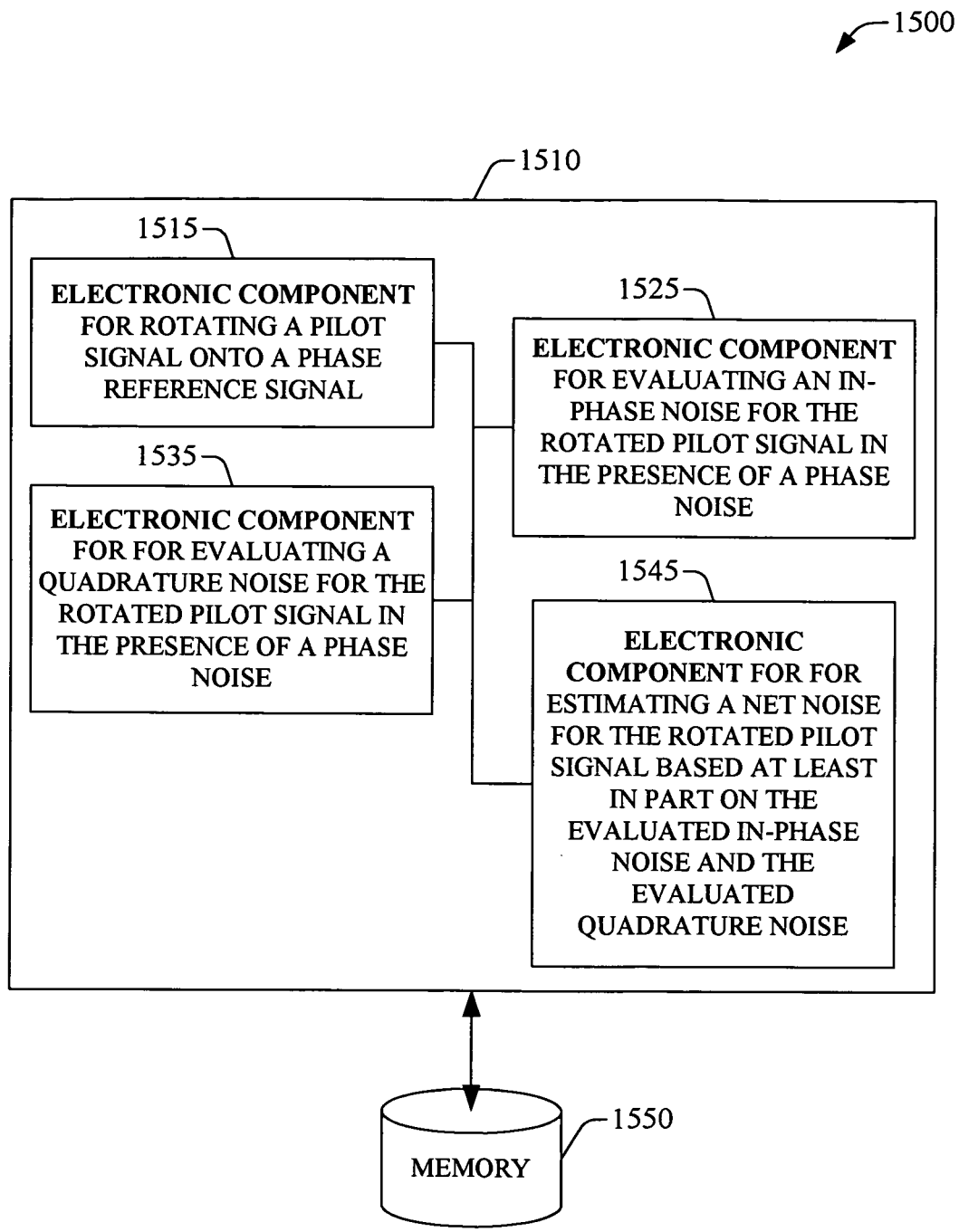
FIG. 15 illustrates a block diagram of an example system 1500 that enables generation of net noise estimates in the presence of phase noise in accordance with aspects described herein.

FIG. 15 illustrates a block diagram of an example system 1500 that enables generation of net noise estimates in the presence of phase noise in accordance with aspects described herein. System 1500 can reside, at least partially, within a mobile (e.g., base station 1402). System 1500 includes a logical grouping 1510 of electronic components that can act in conjunction. In an aspect of the subject innovation, logical grouping 1510 includes an electronic component 1515 for rotating a pilot signal onto a phase reference signal; an electronic component 1525 for evaluating an in-phase noise for the rotated pilot signal in the presence of a phase noise; and an electronic component 1535 for evaluating a quadrature noise for the rotated pilot signal in the presence of a phase noise. In addition, system 1500 can include electronic component 1545 for estimating a net noise for the rotated pilot signal based at least in part on the evaluated in-phase noise and the evaluated quadrature noise.

System 1500 can also include a memory 1550 that retains instructions for executing functions associated with electronic components 1515, 1525, 1535, and 1545, as well as measured or computed data that may be generated during executing such functions. While shown as being external to memory 1550, it is to be understood that one or more of electronic components 1515, 1525, 1535, and 1545 and can exist within memory 1550.

For a software implementation, the techniques described herein may be implemented with modules (e.g., procedures, functions, and so on) that perform the functions described herein. The software codes may be stored in memory units, or memories, and executed by processors. A memory unit, or memory, may be implemented within the processor or external to the processor, in which case it can be communicatively coupled to the processor via various conventional means.

Various aspects or features described herein may be implemented as a method, apparatus, or article of manufacture employing standard programming and/or engineering techniques. The term "article of manufacture" as utilized herein is intended to encompass a computer program accessible from any computer-readable device, carrier, or media. For example, computer-readable media can include but are not limited to magnetic storage devices (e.g. hard disk, floppy disk, magnetic strips, etc.), optical disks (e.g., compact disk (CD), digital versatile disk (DVD), etc.), smart cards, and flash memory devices (e.g. EPROM, card, stick, key drive, etc.). Additionally, various storage media described herein can represent one or more devices and/or other machine-readable media for storing information. The term "machine-readable medium" can include, without being limited to include, wireless channels and various other media capable of storing, containing, and/or carrying instruction(s) and/or data.

As it employed herein, the term "processor" can refer to a classical architecture or a quantum computer. Classical architecture comprises, but is not limited to comprise, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Quantum computer architecture may be based on qubits embodied in gated or self-assembled quantum dots, nuclear magnetic resonance platforms, superconducting Josephson junctions, etc. Processors can exploit nano-scale architectures such as, but not limited to, molecular and quantum-dot based transistors, switches and gates, in order to optimize space usage or enhance performance of user equipment. A processor may also be implemented as a combination of computing devices, e.g., a combination of a DSP and a microprocessor, a plurality of microprocessors, one or more microprocessors in conjunction with a DSP core, or any other such configuration.

Furthermore, in the subject specification and annexed drawings, the term "memory" refers to data stores, algorithm stores, and other information stores such as subscriber databases, billings databases, or specification/content stores. It will be appreciated that the memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems and/or methods herein are intended to comprise, without being limited to, these and any other suitable types of memory.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the terms "includes," "including," "possess," "possessing," and the like are used in the subject specification, such terms are intended to be inclusive in a manner similar to the term "comprising" as "comprising" is interpreted when employed as a transitional word in a claim.

What is claimed is:

1. A method comprising:
evaluating an in-phase noise variance for a pilot signal in the presence of a phase noise by a processor of an electronic device;
evaluating a quadrature noise variance for the pilot signal in the presence of the phase noise by the processor; and
estimating a net noise variance for the pilot signal based at least in part on the evaluated in-phase noise variance or the evaluated quadrature noise variance by the processor, wherein estimating a net noise variance for the pilot signal based at least in part on the evaluated in-phase noise variance or the evaluated quadrature noise variance comprises combining the evaluated in-phase noise variance and the evaluated quadrature noise variance by:
computing a running average ($<N^{(I)}>$) of a set of in-phase noise variance estimates;
computing a running average ($<N^{(Q)}>$) of a set of quadrature noise variance estimates;
assigning $<N^{(I)}>$ to the net noise variance estimate when a ratio of $<N^{(Q)}>$ to $<N^{(I)}>$ is greater than a threshold; and
assigning a weighted average of $<N^{(Q)}>$ and $<N^{(I)}>$ to the net noise variance estimate when the ratio of $<N^{(Q)}>$ to $<N^{(I)}>$ is one of lower than or equal to the threshold.

2. The method of claim 1, wherein the weight of $<N^{(Q)}>$ is ½ and the weight of $<N^{(I)}>$ is ½.

3. The method of claim 1, wherein weights in the weighted average are optimal weights ($w_I, w_Q$) each based at least in part on a first variance ($\sigma_I^2$) of the set of in-phase noise variance estimates, or a second variance ($\sigma_Q^2$) of the set of quadrature noise variance estimates.

4. The method of claim 3, wherein $$w_I = \frac{(\sigma_I^2)^{-1}}{(\sigma_I^2)^{-1} + (\sigma_Q^2)^{-1}} \text{ and } w_Q = \frac{(\sigma_Q^2)^{-1}}{(\sigma_I^2)^{-1} + (\sigma_Q^2)^{-1}}.$$

5. The method of claim 4, further comprising computing $\sigma_I^2$ and $\sigma_Q^2$.

6. The method of claim 5, further comprising generating a channel quality indicator based at least in part on the estimated net noise variance.

7. The method of claim 6 further comprising:
computing a desensitization factor Γ, wherein $$\Gamma = -\frac{1}{2}\sum_{n=0}^{k_l-1} \phi^2(n)$$

with $k_l$ a code spreading factor, $\phi(n)$ a phase noise sequence, and n an integer; and compensating a signal strength estimate with the desensitization factor.

8. The method of claim 7, further comprising controlling power allocation based at least in part on the estimated net noise variance and the compensated signal strength.

9. An apparatus comprising:
means for rotating a pilot signal onto a phase reference signal;
means for evaluating an in-phase noise for the rotated pilot signal in the presence of a phase noise;
means for evaluating a quadrature noise for the rotated pilot signal in the presence of a phase noise; and
means for estimating a net noise for the rotated pilot signal based at least in part on the evaluated in-phase noise and the evaluated quadrature noise, wherein the means for estimating a net noise for the rotated pilot signal based at least in part on the evaluated in-phase noise and the evaluated quadrature noise comprises means for combining the evaluated in-phase noise and the evaluated quadrature noise, the means for combining further comprising:
means for computing a running average ($<N^{(I)}>$) of a set of in-phase noise estimates;
means for computing a running average ($<N^{(Q)}>$) of a set of quadrature noise estimates;
means for assigning $<N^{(I)}>$ to the net noise estimate when a ratio of $<N^{(Q)}>$ to $<N^{(I)}>$ is greater than a threshold; and
means for assigning a weighted average of $<N^{(Q)}>$ and $<N^{(I)}>$ to the net noise estimate when the ratio of $<N^{(Q)}>$ to $<N^{(I)}>$ is one of lower than or equal to the threshold.

10. The apparatus of claim 9, wherein weights in the weighted average are optimal weights ($w_I, w_Q$) each based at least in part on a first variance ($\sigma_I^2$) of the set of in-phase noise estimates, or a second variance ($\sigma_Q^2$) of the set of quadrature noise estimates.

11. The apparatus of claim 10, wherein $$w_I = \frac{(\sigma_I^2)^{-1}}{(\sigma_I^2)^{-1} + (\sigma_Q^2)^{-1}} \text{ and } w_Q = \frac{(\sigma_Q^2)^{-1}}{(\sigma_I^2)^{-1} + (\sigma_Q^2)^{-1}}.$$

12. The apparatus of claim 11, further comprising means for computing $\sigma_I^2$ and $\sigma_Q^2$.

13. The apparatus of claim 9, wherein the phase reference signal is at least one of a filtered version of the pilot symbol stream or an averaged version of the pilot stream.

14. The apparatus of claim 9 further comprising:
means for evaluating a desensitization factor $\Gamma$, wherein $$\Gamma = -\frac{1}{2}\sum_{n=0}^{k_l-1} \phi^2(n)$$

with $k_l$ a code spreading factor, $\phi(n)$ a phase noise sequence, and n an integer;
means for compensating a signal strength estimate with the desensitization factor; and
means for generating a channel quality indicator based at least in part on the estimated net noise and the compensated signal strength estimate.

15. A non-transitory computer program product comprising a computer-readable medium including:
code for causing a computer to rotate a pilot signal onto a phase reference signal;
code for causing a computer to evaluate an in-phase noise variance for the rotated pilot signal in the presence of a phase noise;
code for causing a computer to evaluate a quadrature noise variance for the rotated pilot signal in the presence of a phase noise;
code for causing a computer to estimate a net noise variance for the rotated pilot signal based at least in part on the evaluated in-phase noise variance or the evaluated quadrature noise variance, comprising:
code for causing the computer to quantify a running average ($<N^{(I)}>$) of a set of in-phase noise variance estimates;
code for causing the computer to quantify a running average ($<N^{(Q)}>$) of a set of quadrature noise variance estimates;
code for causing the computer to assign $<N^{(I)}>$ to the net noise variance estimate when a ratio of $<N^{(Q)}>$ to $<N^{(I)}>$ is greater than a threshold; and
code for causing the computer to assign a weighted average of $<N^{(Q)}>$ and $<N^{(I)}>$ to the net noise variance estimate when the ratio of $<N^{(Q)}>$ to $<N^{(I)}>$ is one of lower than or equal to the threshold; and
code for causing a computer to generate a channel quality indicator based at least in part on the estimated net noise variance.

16. The computer program product of claim 15, wherein weights in the weighted average are optimal weights ($w_I, w_Q$) each based at least in part on a first variance ($\sigma_I^2$) of the set of in-phase noise variance estimates, or a second variance ($\sigma_Q^2$) of the set of quadrature noise variance estimates.

17. The computer program product of claim 16, wherein $$w_I = \frac{(\sigma_I^2)^{-1}}{(\sigma_I^2)^{-1} + (\sigma_Q^2)^{-1}} \text{ and } w_Q = \frac{(\sigma_Q^2)^{-1}}{(\sigma_I^2)^{-1} + (\sigma_Q^2)^{-1}}.$$

18. The computer program product of claim 17, the computer-readable medium further comprising code for causing a computer to calculate $\sigma_I^2$ and $\sigma_Q^2$.

19. The computer program of claim 15, code for causing a computer to generate a channel quality indicator based at least in part on the estimated net noise variance further comprising:
code for causing the computer to determine a desensitization factor $\Gamma$, wherein $$\Gamma = -\frac{1}{2}\sum_{n=0}^{k_l-1} \phi^2(n)$$

with $k_I$ a code spreading factor, $\phi(n)$ a phase noise sequence, and n an integer; and code for causing the computer to compensate a signal strength estimate with the desensitization factor.

20. An electronic device that operates in a wireless environment, the electronic device comprising:
a processor configured to evaluate an in-phase noise for a pilot signal in the presence of a phase noise; to evaluate a quadrature noise for the pilot signal in the presence of a phase noise; and to estimate a net noise for the pilot signal based at least in part on the evaluated in-phase noise or the evaluated quadrature noise by:
quantifying a running average ($<N^{(I)}>$) of a set of in-phase noise estimates;
quantifying a running average ($<N^{(Q)}>$) of a set of quadrature noise estimates;
assigning $<N^{(I)}>$ to the net noise estimate when a ratio of $<N^{(Q)}>$ to $<N^{(I)}>$ is greater than a threshold; and
assigning a weighted average of $<N^{(Q)}>$ and $<N^{(I)}>$ to the net noise estimate when the ratio of $<N^{(Q)}>$ to $<N^{(I)}>$ is one of lower than or equal to the threshold; and
a memory coupled to the processor.

21. The electronic device of claim 20, wherein weights in the weighted average are optimal weights ($w_I,w_Q$) each based at least in part on a first variance ($\sigma_I^2$) of the set of in-phase noise estimates, or a second variance ($\sigma_Q^2$) of the set of quadrature noise estimates.

22. The electronic device of claim 21, wherein $$w_I = \frac{(\sigma_I^2)^{-1}}{(\sigma_I^2)^{-1}+(\sigma_Q^2)^{-1}} \text{ and } w_Q = \frac{(\sigma_Q^2)^{-1}}{(\sigma_I^2)^{-1}+(\sigma_Q^2)^{-1}}.$$

23. The electronic device of claim 22, the processor further configured to calculate $\sigma_I^2$ and $\sigma_Q^2$.

24. The electronic device of claim 20, wherein the pilot signal is a received pilot signal rotated onto a phase reference signal, the phase reference signal is at least one of a filtered version of the received pilot signal or an averaged version of the received pilot signal.

25. The electronic device of claim 20, the processor further configured to generate a channel quality indicator based at least in part on the estimated net noise.

26. The electronic device of claim 25, wherein to generate a channel quality indicator based at least in part on the estimated net noise includes:
to determine a desensitization factor Γ, wherein $$\Gamma = -\frac{1}{2}\sum_{n=0}^{k_I-1} \phi^2(n)$$

with $k_I$ a code spreading factor, $\phi(n)$ a phase noise sequence, and n an integer; and
to compensate a signal strength estimate with the desensitization factor.

27. The electronic device of claim 20, wherein the memory stores at least one of a set of in-phase noise estimates, a set of quadrature noise estimates, or a set of desensitization factors.

28. A method comprising:
evaluating an in-phase noise variance for a pilot signal in the presence of a phase noise by a processor of an electronic device;
evaluating a quadrature noise variance for the pilot signal in the presence of the phase noise by the processor; and
estimating a net noise variance for the pilot signal based at least in part on the evaluated in-phase noise variance or the evaluated quadrature noise variance by the processor, wherein estimating a net noise variance for the pilot signal based at least in part on the evaluated in-phase noise variance or the evaluated quadrature noise variance comprises combining the evaluated in-phase noise variance and the evaluated quadrature noise variance by:
computing a running average ($<N^{(I)}>$) of a set of in-phase noise estimates;
computing a running average ($<N^{(Q)}>$) of a set of quadrature noise estimates;
computing an offset $\Delta=<N^{(I)}>-<N^{(Q)}>$ and subtracting the offset from the evaluated quadrature noise; and
generating the net noise variance estimate as a weighted average of the evaluated in-phase noise variance and the evaluated quadrature noise variance adjusted by Δ.

29. An apparatus comprising:
means for rotating a pilot signal onto a phase reference signal;
means for evaluating an in-phase noise for the rotated pilot signal in the presence of a phase noise;
means for evaluating a quadrature noise for the rotated pilot signal in the presence of a phase noise; and
means for estimating a net noise for the rotated pilot signal based at least in part on the evaluated in-phase noise and the evaluated quadrature noise, wherein the means for estimating a net noise for the rotated pilot signal based at least in part on the evaluated in-phase noise and the evaluated quadrature noise comprises means for combining the evaluated in-phase noise and the evaluated quadrature noise, the means for combining further comprising:
means for computing a running average ($<N^{(I)}>$) of a set of in-phase noise estimates;
means for computing a running average ($<N^{(Q)}>$) of a set of quadrature noise estimates;
means for compensating the evaluated quadrature noise; and
means for evaluating a weighted average of the evaluated in-phase noise and the compensated evaluated quadrature noise.

30. An electronic device that operates in a wireless environment, the electronic device comprising:
a processor configured to evaluate an in-phase noise for a pilot signal in the presence of a phase noise; to evaluate a quadrature noise for the pilot signal in the presence of a phase noise; and to estimate a net noise for the pilot signal based at least in part on the evaluated in-phase noise or the evaluated quadrature noise by:
quantifying a running average ($<N^{(I)}>$) of a set of in-phase noise estimates;
quantifying a running average ($<N^{(Q)}>$) of a set of quadrature noise estimates;
quantifying an offset $\Delta=<N^{(I)}>-<N^{(Q)}>$ and subtracting the offset from the evaluated quadrature noise; and
generating the net noise estimate as weighted average of the evaluated in-phase noise and the evaluated quadrature noise adjusted by Δ; and
a memory coupled to the processor.

31. A non-transitory computer program product comprising a computer-readable medium including:
code for causing a computer to rotate a pilot signal onto a phase reference signal;

code for causing a computer to evaluate an in-phase noise variance for the rotated pilot signal in the presence of a phase noise;

code for causing a computer to evaluate a quadrature noise variance for the rotated pilot signal in the presence of a phase noise;

code for causing a computer to estimate a net noise variance for the pilot signal based at least in part on the evaluated in-phase noise variance or the evaluated quadrature noise variance, comprising:

code for causing the computer to quantify a running average ($<N^{(I)}>$) of a set of in-phase noise variance estimates;

code for causing the computer to quantify a running average ($<N^{(Q)}>$) of a set of quadrature noise variance estimates;

code for causing the computer to quantify an offset $\Delta = <N^{(I)}> - <N^{(Q)}>$ and subtracting the offset from the evaluated quadrature noise variance; and code for causing the computer to generate the net noise variance estimate as a weighted average of the evaluated in-phase noise variance and the evaluated quadrature noise variance adjusted by $\Delta$; and code for causing a computer to generate a channel quality indicator based at least in part on the estimated net noise variance.

* * * * *